United States Patent
Retana et al.

(10) Patent No.: US 7,940,776 B2
(45) Date of Patent: May 10, 2011

(54) FAST RE-ROUTING IN DISTANCE VECTOR ROUTING PROTOCOL NETWORKS

(75) Inventors: Alvaro Retana, Raleigh, NC (US); Yi Yang, Morrisville, NC (US); Stewart Bryant, Merstham (GB); Ian Michael Charles Shand, Cobham (GB); Russell White, Holly Springs, NC (US)

(73) Assignee: Cisco Technology, Inc., San Jose, CA (US)

( * ) Notice: Subject to any disclaimer, the term of this patent is extended or adjusted under 35 U.S.C. 154(b) by 502 days.

(21) Appl. No.: 11/762,547

(22) Filed: Jun. 13, 2007

(65) Prior Publication Data

US 2008/0310433 A1 Dec. 18, 2008

(51) Int. Cl.
*H04L 12/56* (2006.01)

(52) U.S. Cl. .................................. 370/395.31

(58) Field of Classification Search ............. 370/395.31, 370/351, 401, 392, 238
See application file for complete search history.

(56) References Cited

U.S. PATENT DOCUMENTS

| | | | |
|---|---|---|---|
| 4,956,835 A | 9/1990 | Grover | |
| 5,243,592 A | 9/1993 | Perlman et al. | |
| 5,430,727 A | 7/1995 | Callon | |
| 5,825,772 A | 10/1998 | Dobbins et al. | |
| 5,959,968 A | 9/1999 | Chin et al. | |
| 6,002,674 A | 12/1999 | Takei et al. | |
| 6,018,576 A | 1/2000 | Croslin | |
| 6,032,194 A | 2/2000 | Gai et al. | |
| 6,044,075 A | 3/2000 | Le Boudec et al. | |
| 6,061,650 A | 5/2000 | Malkin et al. | |
| 6,098,107 A | 8/2000 | Narvaez-Guarnieri et al. | |
| 6,111,257 A | 8/2000 | Shand et al. | |
| 6,128,750 A | 10/2000 | Espy et al. | |
| 6,148,410 A | 11/2000 | Saskey et al. | |
| 6,185,598 B1 | 2/2001 | Farber et al. | |
| 6,243,754 B1 | 6/2001 | Guerin et al. | |
| 6,246,669 B1 | 6/2001 | Chevalier et al. | |
| 6,256,295 B1 | 7/2001 | Callon | |
| 6,295,275 B1 | 9/2001 | Croslin | |
| 6,321,271 B1 | 11/2001 | Kodialam et al. | |
| 6,343,122 B1 | 1/2002 | Andersson | |

(Continued)

FOREIGN PATENT DOCUMENTS

AU 2004311004 (A1) 6/2005

(Continued)

OTHER PUBLICATIONS

U.S. Appl. No. 11/526,933, Bryant et al.

(Continued)

*Primary Examiner* — Dang T. Ton
*Assistant Examiner* — Kevin Lee
(74) *Attorney, Agent, or Firm* — Patent Capital Group

(57) ABSTRACT

In one embodiment, a method includes sending an adjacency discovery message 1 from a local router over a direct link to a first neighbor router. An adjacency discovery message is not forwarded and includes a repair address. The repair address indicates the local router but is not advertised as reachable over the direct link. An outbound routing update message is sent to a different second neighbor router. The outbound routing update message is forwarded and includes reachability data that indicates the repair address is reachable. A payload of an inbound tunneled packet received at the local router and directed to the repair address is forwarded based on a destination indicated in the payload.

25 Claims, 7 Drawing Sheets

U.S. PATENT DOCUMENTS

| | | |
|---|---|---|
| 6,349,091 B1 | 2/2002 | Li |
| 6,356,546 B1 | 3/2002 | Beshai |
| 6,389,764 B1 | 5/2002 | Stubler et al. |
| 6,473,421 B1 | 10/2002 | Tappan |
| 6,507,577 B1 | 1/2003 | Mauger et al. |
| 6,578,086 B1 | 6/2003 | Regan et al. |
| 6,654,361 B1 | 11/2003 | Dommety et al. |
| 6,690,671 B1 | 2/2004 | Anbiah et al. |
| 6,697,325 B1 | 2/2004 | Cain |
| 6,697,333 B1 | 2/2004 | Bawa et al. |
| 6,704,320 B1 | 3/2004 | Narvaez et al. |
| 6,711,125 B1 | 3/2004 | Walrand et al. |
| 6,714,551 B1 | 3/2004 | Le-Ngoc |
| 6,718,382 B1 | 4/2004 | Li et al. |
| 6,721,269 B2 | 4/2004 | Cao et al. |
| 6,724,722 B1 | 4/2004 | Wang et al. |
| 6,744,727 B2 | 6/2004 | Liu et al. |
| 6,778,531 B1 | 8/2004 | Kodialam et al. |
| 6,829,215 B2 | 12/2004 | Tomar |
| 6,928,484 B1 | 8/2005 | Huai et al. |
| 6,944,131 B2 | 9/2005 | Beshai et al. |
| 6,950,870 B2 | 9/2005 | Beaulieu |
| 6,982,951 B2 | 1/2006 | Doverspike et al. |
| 6,987,727 B2 | 1/2006 | Fredette et al. |
| 6,990,068 B1 | 1/2006 | Saleh et al. |
| 6,993,593 B2 | 1/2006 | Iwata |
| 6,996,065 B2 | 2/2006 | Kodialam et al. |
| 7,058,016 B1 | 6/2006 | Harper |
| 7,099,286 B1 | 8/2006 | Swallow |
| 7,113,481 B2 | 9/2006 | Elie-Dit-Cosaque et al. |
| 7,158,486 B2 | 1/2007 | Rhodes |
| 7,177,295 B1 | 2/2007 | Sholander et al. |
| 7,188,280 B2 | 3/2007 | Shinomiya et al. |
| 7,242,664 B2 | 7/2007 | Einstein et al. |
| 7,260,645 B2 | 8/2007 | Bays |
| 7,274,654 B2 | 9/2007 | Yang et al. |
| 7,274,658 B2 | 9/2007 | Bornstein et al. |
| 7,280,472 B2 | 10/2007 | Rigby et al. |
| 7,362,709 B1 | 4/2008 | Hui et al. |
| 7,420,989 B2 | 9/2008 | Liu et al. |
| 7,490,165 B1 | 2/2009 | Katukam et al. |
| 7,500,013 B2 | 3/2009 | Dziong et al. |
| 7,519,009 B2 | 4/2009 | Fleischman |
| 7,701,845 B2 | 4/2010 | Bryant et al. |
| 2002/0037010 A1 | 3/2002 | Yamauchi |
| 2002/0062388 A1 | 5/2002 | Ogier et al. |
| 2002/0069292 A1 | 6/2002 | Gaddis et al. |
| 2002/0093954 A1 | 7/2002 | Weil et al. |
| 2002/0112072 A1 | 8/2002 | Jain |
| 2002/0116669 A1 | 8/2002 | Jain |
| 2002/0131362 A1 | 9/2002 | Callon |
| 2002/0171886 A1 | 11/2002 | Wu et al. |
| 2002/0172157 A1 | 11/2002 | Rhodes |
| 2002/0191545 A1 | 12/2002 | Pieda et al. |
| 2003/0007500 A1 | 1/2003 | Rombeaut et al. |
| 2003/0063613 A1 | 4/2003 | Carpini et al. |
| 2003/0079040 A1 | 4/2003 | Jain et al. |
| 2003/0117950 A1 | 6/2003 | Huang |
| 2003/0123457 A1 | 7/2003 | Koppol |
| 2003/0161338 A1 | 8/2003 | Ng et al. |
| 2003/0193959 A1 | 10/2003 | Lui et al. |
| 2003/0202473 A1 | 10/2003 | Patrick et al. |
| 2003/0210705 A1 | 11/2003 | Seddigh et al. |
| 2003/0233595 A1 | 12/2003 | Charny et al. |
| 2004/0001497 A1 | 1/2004 | Sharma |
| 2004/0001508 A1 | 1/2004 | Zheng et al. |
| 2004/0071089 A1 | 4/2004 | Bauer et al. |
| 2004/0085894 A1 | 5/2004 | Wang et al. |
| 2004/0088424 A1 | 5/2004 | Luo |
| 2004/0117251 A1 | 6/2004 | Shand |
| 2004/0151181 A1 | 8/2004 | Chu et al. |
| 2004/0185777 A1 | 9/2004 | Bryson |
| 2004/0190454 A1 | 9/2004 | Higasiyama |
| 2004/0203827 A1 | 10/2004 | Heiner et al. |
| 2004/0205239 A1 | 10/2004 | Doshi et al. |
| 2005/0007950 A1 | 1/2005 | Liu |
| 2005/0013241 A1 | 1/2005 | Beller et al. |
| 2005/0031339 A1 | 2/2005 | Qiao et al. |
| 2005/0038909 A1 | 2/2005 | Yoshiba et al. |
| 2005/0047353 A1 | 3/2005 | Hares |
| 2005/0068968 A1 | 3/2005 | Ovadia et al. |
| 2005/0097219 A1 | 5/2005 | Goguen et al. |
| 2005/0117593 A1 | 6/2005 | Shand |
| 2005/0201273 A1 | 9/2005 | Shimizu |
| 2005/0201371 A1 | 9/2005 | Lauer |
| 2005/0254430 A1* | 11/2005 | Clark et al. .................. 370/241 |
| 2005/0265228 A1 | 12/2005 | Fredette et al. |
| 2005/0281271 A1 | 12/2005 | Beshai et al. |
| 2006/0007929 A1 | 1/2006 | Desai et al. |
| 2006/0013125 A1 | 1/2006 | Vasseur et al. |
| 2006/0018253 A1 | 1/2006 | Windisch et al. |
| 2006/0031482 A1 | 2/2006 | Mohan et al. |
| 2006/0050630 A1 | 3/2006 | Kobayashi et al. |
| 2006/0092941 A1 | 5/2006 | Kusama |
| 2006/0140111 A1 | 6/2006 | Vasseur et al. |
| 2006/0140190 A1 | 6/2006 | Lee |
| 2006/0187819 A1 | 8/2006 | Bryant et al. |
| 2006/0193252 A1 | 8/2006 | Naseh et al. |
| 2006/0221962 A1 | 10/2006 | Previdi et al. |
| 2006/0268879 A1 | 11/2006 | Xhafa et al. |
| 2006/0291446 A1 | 12/2006 | Caldwell et al. |
| 2007/0005784 A1 | 1/2007 | Hares et al. |
| 2007/0011284 A1 | 1/2007 | Le Roux et al. |
| 2007/0011351 A1 | 1/2007 | Bruno et al. |
| 2007/0038767 A1 | 2/2007 | Miles et al. |
| 2007/0091793 A1 | 4/2007 | Filsfils et al. |
| 2007/0091794 A1 | 4/2007 | Filsfils et al. |
| 2007/0091795 A1 | 4/2007 | Bonaventure et al. |
| 2007/0183317 A1 | 8/2007 | Vasseur et al. |
| 2007/0183334 A1* | 8/2007 | White et al. .................. 370/238 |
| 2007/0201355 A1 | 8/2007 | Vasseur et al. |
| 2007/0248016 A1 | 10/2007 | Ashwood et al. |
| 2008/0025203 A1 | 1/2008 | Tallet |
| 2008/0062986 A1 | 3/2008 | Shand et al. |
| 2008/0089227 A1 | 4/2008 | Guichard et al. |
| 2008/0192627 A1 | 8/2008 | Lichtwald |
| 2008/0192762 A1 | 8/2008 | Kompella et al. |
| 2008/0209030 A1* | 8/2008 | Goldszmidt et al. .......... 709/224 |
| 2008/0219153 A1 | 9/2008 | Shand et al. |
| 2008/0259923 A1* | 10/2008 | Bryant et al. .................. 370/392 |
| 2008/0317055 A1 | 12/2008 | Zetterlund et al. |
| 2009/0080431 A1 | 3/2009 | Rekhter |
| 2009/0129771 A1 | 5/2009 | Saniee et al. |

FOREIGN PATENT DOCUMENTS

| | | |
|---|---|---|
| CN | 1440159 A | 9/2003 |
| CN | 1943167 A | 4/2007 |
| CN | 101099086 A | 1/2008 |
| WO | WO 01/78278 A1 | 10/2001 |
| WO | WO 02/06918 A2 | 1/2002 |
| WO | WO 2005/039109 A1 | 4/2005 |
| WO | WO 2005/053234 A1 | 6/2005 |
| WO | WO 2005/055499 | 6/2005 |
| WO | WO 2006/091652 A1 | 8/2006 |

OTHER PUBLICATIONS

Raju et al., "A New Approach to On-Demand Loop-Free Multipath Routing," Computer Communications and Networks, 1999, IEEE, Oct. 1999, XP010359531, ISBN: 978-0-7803-5794-5, downloaded from http://ieeexplore.ieee.org/xpl/absprintf.jsp?arnumber=805568&page=FREE, Abstract Only, 1 page.

Anonymous, "IS-IS, Intermediate System-to-Intermediate System, ISO 10589," NetworkSorcery.com, downloaded Oct. 28, 2009, pp. 1-7.

R. Callon, "Use of OSI IS-IS for Routing in TCP/IP and Dual Environments," Internet Engineering Task Force (IETF) Request for Comments (RFC) 1195, Dec. 1990, downloaded Oct. 28, 2009 from http://portal.acm.org/citation.cfm?id=RFC1195, Abstract Only, 2 pages.

D. Oran, "OSI IS-IS Intra-domain Routing Protocol," [republication of ISO 10589], IETF RFC 1142, Feb. 1990, downloaded Oct. 28, 2009 from http://www.ietf.org/rfc/rfc1142.txt, 206 pages.

Y. Rekhter et al., "A Border Gateway Protocol 4 (BGP-4)," IETF RFC 1771, Mar. 1995, downloaded Oct. 28, 2009 from http://www.ietf.org/rfc/rfc1771.txt, 54 pages.

C. Hedrick, "Routing Information Protocol," IETF RFC 1058, Jun. 1988, downloaded Oct. 28, 2009 from http://www.faqs.org/rfcs/rfc1058.html, 27 pages.

G. Malkin, "RIP Version 2 Carrying Additional Information," IETF RFC 1723, Nov. 1994, downloaded Oct. 28, 2009 from http://www.rfc-editor.org/rfc/rfc1723.txt, 9 pages.

Andersson, L. et al., "LDP Specification," Network Working Group RFC 3036, Jan. 2001, downloaded Oct. 28, 2009 from http://www.ietf.org/rfc/rfc3036.txt, 124 pages.

Bryant, S. et al., "IP Fast Reroute Using Tunnels," Network Working Group, Internet Draft, May 2004, downloaded Oct. 28, 2009 from http://tools.ietf.org/html/draft-bryant-ipfrr-tunnels-00, 29 pages.

Pan, P. et al., "Fast Reroute Extensions to RSVP-TE for LSP Tunnels," Network Working Group RFC 4090, May 2005, downloaded Oct. 28, 2009 from http://www.faqs.org/rfcs/rfc4090.html, 29 pages.

Shand, M. et al., "IP Fast Reroute Framework," Network Working Group, Internet Draft, Jun. 2004, downloaded Oct. 28, 2009 from http://tools.ietf.org/html/draft-ietf-rtgwg-ipfrr-framework-01, 10 pages.

Thorup, Mikkel, "Fortifying OSPF/IS-IS Against Link-failure," AT&T Labs-Research, Sep. 7, 2001, 10 pages.

Tian, Albert J. et al., "Loose Segment Optimization in Explicit Paths," Network Working Group, Internet Draft, Jul. 2004, downloaded Oct. 28, 2009 from http://tools.ietf.org/id/draft-tian-rsvp-loose-seg-opt-00.txt, 8 pages.

Tian, Albert J. et al., Source Routed MPLS LSP Using Domain Wide Label, Network Working Group, Internet Draft, Jul. 2004, downloaded Oct. 28, 2009 from http://tools.ietf.org/id/draft-tian-mpls-lsp-source-route-01.txt, 11 pages.

Zinin, Alex, "Analysis and Minimization of Microloops in Link-state Routing Protocols," Network Working Group, Internet Draft, Oct. 2005, downloaded Oct. 28, 2009 from http://tools.ietf.org/id/draft-ietf-rtgwg-microloop-analysis-01.txt, 17 pages.

Claims dated Mar. 17, 2010, Application No. EP 04795045, European Patent Office, 4 pages.

Claims dated May 31, 2006, Application No. EP 04812468, European Patent Office, 5 pages.

Claims dated May 12, 2010, Application No. EP 06720965, European Patent Office, 5 pages.

Claims dated Dec. 21, 2006, Application No. EP 05749440.3, European Patent Office, 3 pages.

Claims dated Mar. 17, 2010, Application No. EP 04795045.6-2416, European Patent Office, 4 pages.

European Patent Office, "Communication pursuant to Article 94(3) EPC", received in application No. EP 04795045.6-2416, dated Sep. 7, 2009, 5 pages.

European Patent Office, "Supplementary European Search Report", received in application No. EP 06720965, dated Jul. 21, 2009, 6 pages.

European Patent Office, "Supplementary Search Report," received in application No. EP 04812468, dated May 27, 2010, 4 pages.

European Patent Office, "Supplementary European Search Report," received in application No. EP 04795045, dated May 27, 2009, 4 pages.

European Patent Office, "European Search Report," received in Application No. EP 05749440.3 dated Dec. 4, 2009 (3 pages).

USPTO Final Office Action dated Jan. 7, 2009 for U.S. Appl. No. 11/175,805 filed Jul. 5, 2005, USPTO.

USPTO Final Office Action dated Feb. 19, 2010 for U.S. Appl. No. 11/851,255 filed Sep. 6, 2007.

USPTO Notice of Allowance dated May 23, 2008 for U.S. Appl. No. 10/719,003 filed Nov. 21, 2003.

USPTO Notice of Allowance dated Aug. 6, 2010 for U.S. Appl. No. 11/175,805 filed Jul. 5, 2005.

PCT Notification of Transmittal of the International Search Report and the Written Opinion of the International Searching Authority, or the Declaration mailed Oct. 16, 2006 in international application No. PCT/US06/06238.

USPTO Office Action dated Mar. 2, 2010 for U.S. Appl. No. 11/175,805 filed Jul. 5, 2005.

Office Action from EPO for foreign patent application No. 04 800 942.7-1525 dated Apr. 27, 2009, 6 pages.

Pending claims in PCT/US06/06238, 2 pages; [Retrieved and printed on Dec. 3, 2010 from WIPO IP Services].

Karn Phil et al., "Improving Round-Trip Time Estimates in Reliable Transport Protocols," ACM Transactions on Computer Systems, vol. 9, No. 4, 1991, pp. 364-373.

Moy, J., et al., "OSPF Version 2", IETF Standard, Network Working Group, Internet Engineering Task Force, IETF, Apr. 1998, XP015008112, NFC 2328, 245 pages.

"Open Shortest Path First," Jun. 1999, Chapter 42, Internetworking Technologies handbook (all pages of chapter 42).

"Open System of Interconnection Routing Protocol," Jun. 1999, Chapter 41, Internetworking Technologies handbook (all pages of chapter 41).

Translated Abstract for CN Application Serial No. 200410056187, filed Aug. 18, 2004 (1 page) with CN Application (12 pages).

\* cited by examiner

FIG. 2A

210 MODIFIED ROUTING PROTOCOL HELLO MESSAGE

| 212 ADJACENT ADDRESS | 215 REPAIR ADDRESS |

FIG. 2B

220 ROUTING PROTOCOL UPDATE MESSAGE

| 222 REACHABLE ADDRESS | 224 REPORTED COST |

FIG. 2C

230 MODIFIED ROUTING PROTOCOL UPDATE MESSAGE

| 222 REACHABLE ADDRESS | 224 REPORTED COST | 232 REPAIR ADDRESS |

402
FOR EACH NEW NEIGHBOR, DETERMINE NEXT SELF ADDRESS FOR DIRECT LINK WITH NEIGHBOR, AND NEXT SELF REPAIR ADDRESS NOT VIA DIRECT LINK WITH NEXT NEIGHBOR, AND SEND IN MODIFIED HELLO MESSAGE TO NEXT NEIGHBOR

↓

404
FOR EACH NEW NEIGHBOR, SEND UPDATE MESSAGE INDICATING REACHABILITY OF SELF REPAIR ADDRESS FOR OTHER NEIGHBORS

↓

406 RECEIVE TUNNELED DATA PACKET DIRECTED TO A SELF REPAIR ADDRESS?
— YES →
— NO →

408 STRIP TUNNEL HEADER AND FORWARD DATA PACKET

410 RECEIVE HELLO WITH REPAIR ADDRESS?
— YES → 412 ASSOCIATE REPAIR ADDRESS WITH NEIGHBOR → (432)
— NO ↓

420 RECEIVE NORMAL UPDATE?
— YES → 422 ASSOCIATE DESTINATION WITH NEIGHBOR AND COST
— NO ↓

424 RECEIVE UPDATE WITH REPAIR ADDRESS?
— YES → (430)
— NO ↓

426 FAILED NEIGHBOR?
— YES → (470)
— NO ↓

428 RECEIVE DATA PACKET?
— NO → (402)
— YES → 498 FORWARD OR TUNNEL AROUND FAILURE

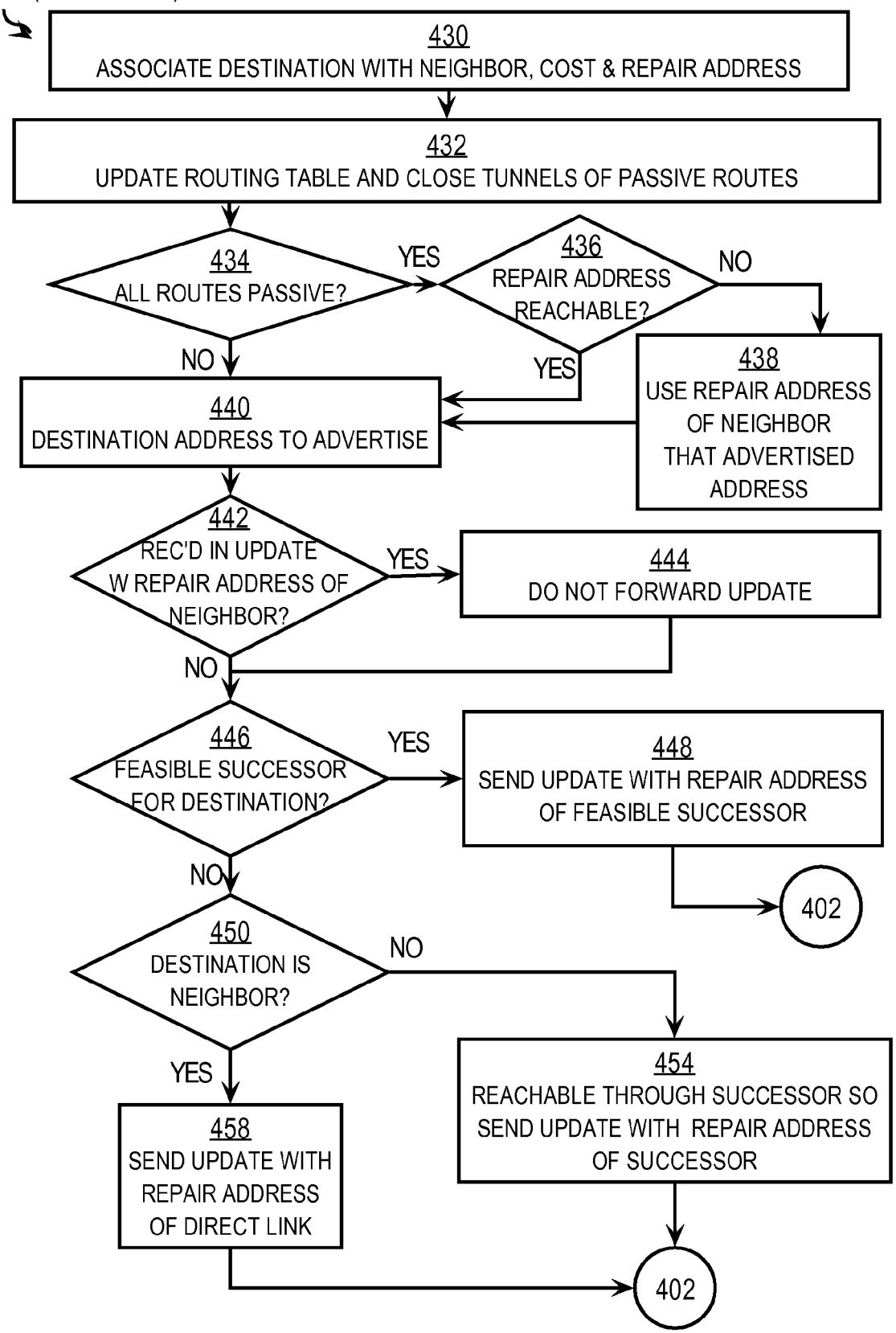

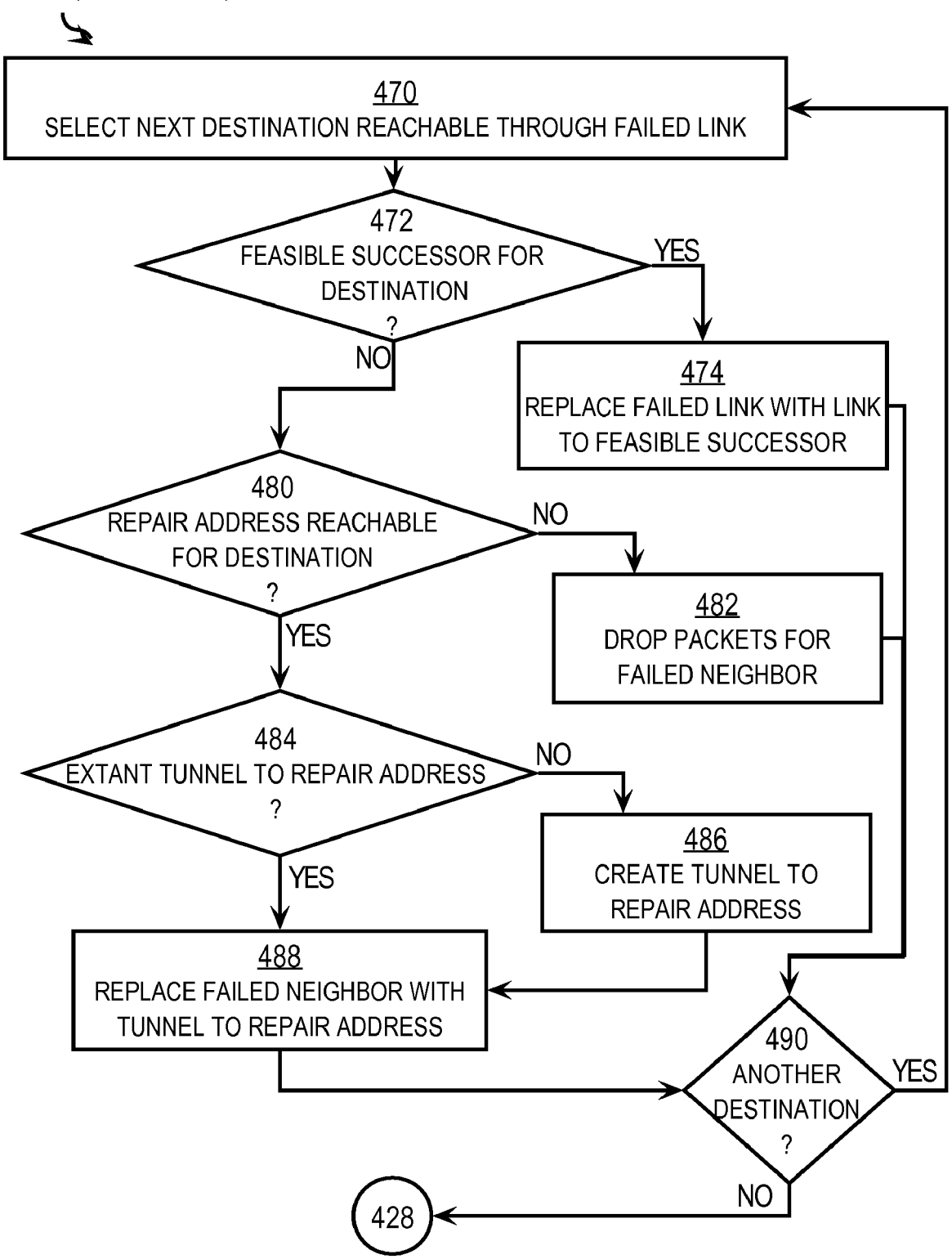

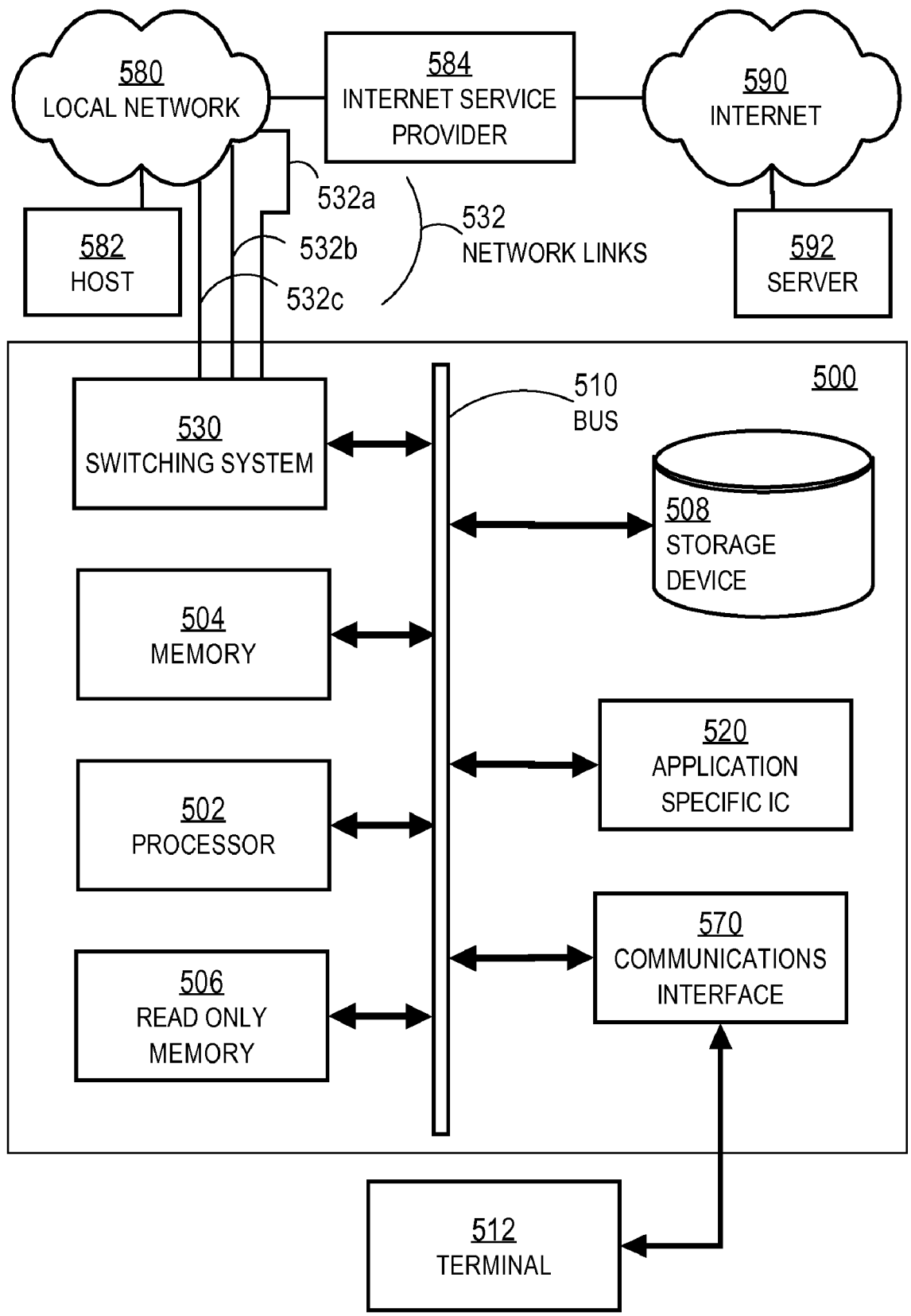

FAST RE-ROUTING IN DISTANCE VECTOR ROUTING PROTOCOL NETWORKS

CROSS-REFERENCE TO RELATED APPLICATIONS

This application is related to application Ser. No. 11/064,275, filed Feb. 22, 2005 and application Ser. No. 11/526,933 filed Sep. 25, 2006.

BACKGROUND OF THE INVENTION

1. Field of the Invention

The present invention relates to forwarding data in data communications networks using the Enhanced Interior Gateway Routing Protocol (EIGRP).

2. Description of the Related Art

Networks of general purpose computer systems and specialized devices connected by external communication links are well known and widely used in commerce. The networks often include one or more network devices that facilitate the passage of information between the computer systems and devices. A network node is a network device or computer or specialized device connected by the communication links. An end node is a node that is configured to originate or terminate communications over the network. An intermediate network node facilitates the passage of data between end nodes.

A portion of a network under the network administration of a single authority, such as an enterprise or Internet service provider (ISP) is called a domain or an autonomous system (AS). Routing facilitates the passage of data based on information shared among different domains. To reduce the consumption of network resources and improve scalability, some routing protocols send only summarized routing information. Routing information for an AS is summarized at its boundaries with one or more other ASs at intermediate network nodes called border gateway nodes or border gateway (BG) routers. Routing information shared within the borders of one AS is exchanged using an interior gateway protocol (IGP).

Example IGPs include the link state protocols such as the intermediate system to intermediate system (IS-IS) protocol and the open shortest path first (OSPF) protocol. Another IGP, developed by Cisco Systems of San Jose, Calif. for use in its intermediate network nodes, is the Enhanced Interior Gateway Routing Protocol (EIGRP). Some of the link-state protocols divide an autonomous system into multiple areas, flood all data for a unified routing database within and area, but send only summarized information between areas. Some IGPs, like EIGRP, send only summary information from each intermediate node in the autonomous system.

EIGRP provides several techniques for enhanced recovery from node and link failure in a communications network by predetermining some parameters, such as feasible successors, used for quickly determining new paths through the network. During recovery, however, some data packets formerly forwarded through a failed link or node are lost until the AS converges on new paths that utilize the remaining links and nodes.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2A illustrates an example modified routing protocol Hello message;

FIG. 2B illustrates a routing protocol update message;

FIG. 2C illustrates an example modified routing protocol update message;

FIG. 4A, FIG. 4B and FIG. 4C illustrate at a high level an example fast re-route process; and FIG. 5 illustrates a computer system upon which an embodiment of the invention may be implemented.

DESCRIPTION OF EXAMPLE EMBODIMENTS

Figure 1:
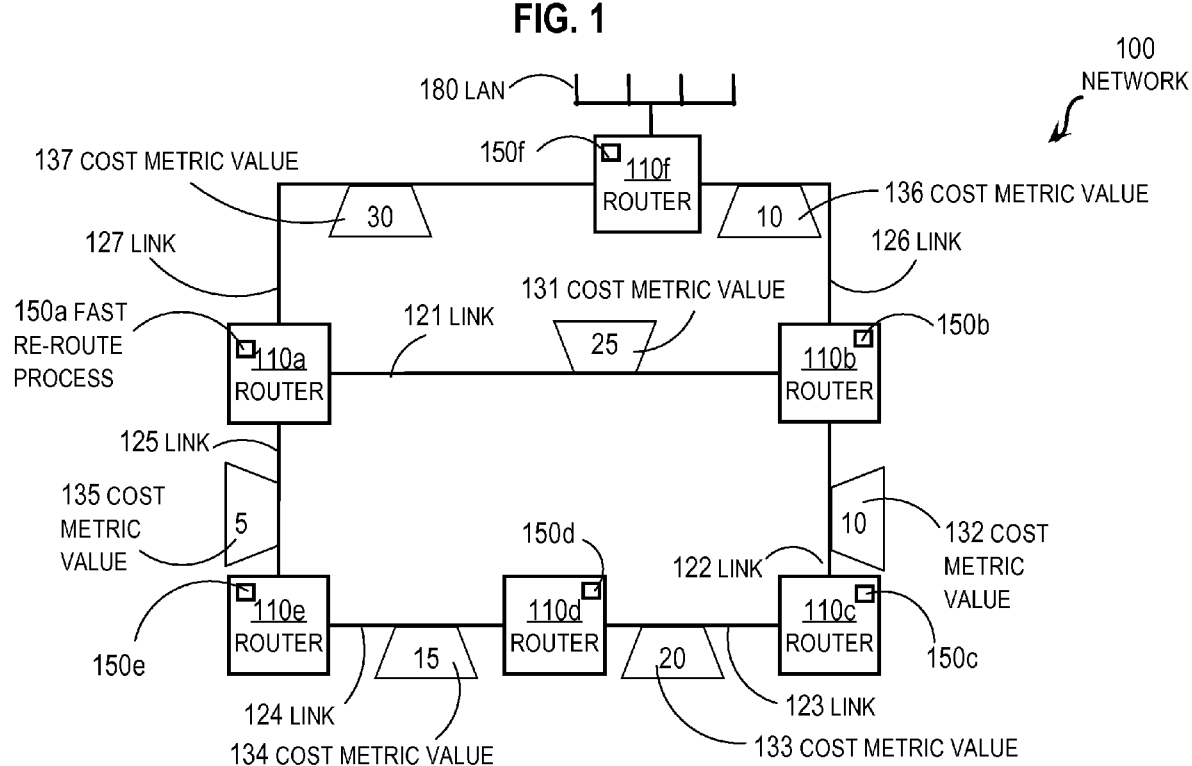
FIG. 1 illustrates an example network with fast re-routing.

Techniques are described for fast re-routing of data packets during recovery. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Some embodiments of the invention are described below in the context of modified EIGRP routers. However, the invention is not limited to modifying EIGRP and may be used to modify any distance vector routing protocol that identifies adjacent network addresses separately from reachable network addresses, selects paths based on a cost metric, or that predetermines loop free possible alternatives (called feasible successors in EIGRP) for the current best next hop (called a successor in EIGRP), when available, based on cost metrics, such as DUAL. For instance, in some embodiments the routing protocol is a border gateway protocol (BGP), in which a next best path is chosen that is known, from an autonomous system (AS) Path, to be loop free.

1.0 Overview

In one set of embodiments, a method includes sending an adjacency discovery message, such as a modified EIGRP HELLO message, from a local router over a direct link between the local router and a first neighbor router. The adjacency discovery message is not forwarded to other nodes by the first neighbor router according to the routing protocol. The adjacency discovery message includes a repair address that indicates the local router but that is not advertised as reachable over the direct link. A routing update message is sent from the local router to a different second neighbor router. The routing update message is forwarded by the second neighbor router according to the routing protocol and includes reachability data that indicates the repair address is reachable. A payload of an inbound tunneled data packet, that is received at the local router and directed to the repair address, is forwarded based on a destination indicated in the payload.

In other embodiments, an apparatus or logic encoded in a tangible medium is configured to perform one or more steps of the above method.

2.0 Network Overview

Communications between nodes are typically effected by exchanging discrete packets of data. Information is exchanged within data packets according to one or more of many well known, new or still developing protocols. In this context, a protocol consists of a set of rules defining how the nodes interact with each other based on information sent over the communication links. Each packet typically comprises 1] header information associated with a particular protocol, and 2] payload information that follows the header information and contains information that may be processed independently of that particular protocol. The header includes information such as the source of the packet, its destination, the length of the payload, or other properties used by the protocol. Often, the data in the payload for the particular protocol includes a header and payload for a different protocol associated with a different layer of detail for information exchange.

The headers included in a packet traversing multiple heterogeneous networks, such as the Internet, typically include a physical (layer 1) header, a data-link (layer 2) header, an internetwork (layer 3) header and a transport (layer 4) header, as defined by the Open Systems Interconnection (OSI) Reference Model. The OSI Reference Model is generally described in more detail in Section 1.1 of the reference book entitled *Interconnections Second Edition*, by Radia Perlman, published September 1999, which is hereby incorporated by reference as though fully set forth herein.

The internetwork header provides information defining the source and destination address within the network. Notably, the path may span multiple physical links. The internetwork header may be formatted according to the Internet Protocol (IP), which specifies IP addresses of both a source and destination node at the end points of the logical path. Thus, the packet may "hop" from node to node along its logical path until it reaches the end node assigned to the destination IP address stored in the packet's internetwork header.

Routers and switches are intermediate network nodes that determine which communication link or links to employ to support the progress of data packets through the network. An intermediate network node that determines which links to employ based on information in the internetwork header (layer 3) is called a router.

Some protocols pass protocol-related information among two or more network nodes in special control packets that are communicated separately and which include a payload of information used by the protocol itself rather than a payload of data to be communicated for another application. These control packets and the processes at network nodes that utilize the control packets are said to be in another dimension, a "control plane," distinct from the "data plane" dimension that includes the data packets with payloads for other applications at the end nodes.

A routing protocol only exchanges control plane messages used for routing data packets sent in a different routed protocol (e.g., IP). As described above, some routing protocols, like EIGRP, send only summary information from each intermediate node within an autonomous system.

To determine the best route in IGPs that send only summary routing information, the summary routing information includes for each destination node, a measure of the cost (called a cost metric) to reach that destination node from the intermediate node (e.g., router) providing the summary information. Metrics of cost to traverse links in a network are well known in the art. Any method known in the art may be used to determine a cost metric value for a link. For example, in some embodiments a cost on a link is given approximately by Equation 1, which is an approximation of a more comprehensive cost metric that includes seven terms.

$$\text{Cost metric} = \text{bandwidth} \cdot 10^{-7} + (\text{sum of link travel time delays}) \cdot 256 \quad (1)$$

A router receives such summary routing information from each neighbor router with which the router shares a direct communications link. The receiving router then determines the route (i.e., the best next hop, also called the best "path" herein) based on the cost metrics reported by all the neighbors and the costs to traverse the link to reach each of those neighbors. In EIGRP, the neighbor router that is the next best hop to a particular destination address is the successor for that destination address. EIGRP also records in storage any alternative neighbor router (called a feasible successor) through which a path is sure to be loop-free. A loop-free path from a particular router is one in which the next hop goes to a router that is not farther from the destination than the particular router itself. If the next hop goes to a farther router, subsequent hops are likely to come back to the particular router, thus forming a loop.

When a router loses a route to a particular destination, a feasible successor is immediately used to forward data packets to that destination. If the router does not have a record in storage for a feasible successor, the router sends a query to each neighbor, asking for the neighbor's routes and costs to the particular destination. As the responses are received, the routes (best next hops) are re-computed. As the responses begin to reflect a settled arrangement of nodes and links, the re-computed routes converge on a stable set of routes. This recovery process takes from several milliseconds to several seconds, even up to a minute or more for large networks. In the meantime, data packets directed to that destination might be dropped, for example if temporary storage, if any, set aside to hold such data packets until convergence, is exceeded.

FIG. 1 illustrates an example network 100. Network 100 includes six intermediate network nodes: router 110a, router 110b, router 110c, router 110d, router 110e and router 110f, collectively referenced hereinafter as routers 110. Network 100 also includes local area network (LAN) 180 connected to router 110f. The routers 110 are connected by seven communication links: link 121, link 122, link 123, link 124, link 125, link 126 and link 127, collectively referenced hereinafter as links 120. Also shown in FIG. 1 is a cost metric value associated with each link. A cost metric value represent a property of a link and is not a separate physical component of network 100. Seven cost metric values are shown: cost metric value 131, cost metric value 132, cost metric value 133, cost metric value 134, cost metric value 135, cost metric value 136 and cost metric value 137 (collectively referenced hereinafter as costs 130) associated with link 121, link 122, link 123, link 124, link 125, link 126 and link 127, respectively. Cost is given in arbitrary units. It is assumed for purposes of illustration that the cost to traverse LAN 180 to any end node thereon is 1.

While a certain number of nodes 110 and links 120 and LAN 180 are depicted in network 100 for purposes of illustration, in other embodiments, a network includes the same, fewer or more nodes, such as routers, with associated links, with the same or different costs 130, and more LANs.

Using the data depicted in FIG. 1, Table 1 lists the cost of using the best links and neighbors to reach the LAN 180 from each router 110. Cost is given in arbitrary units.

TABLE 1

Example costs for the lowest cost path from routers 110 to LAN 180 as depicted in FIG. 1

| Local router | Neighbor router (next hop) | # hops | Total Cost |
|---|---|---|---|
| 110a | 110f | 2 | 31 |
| 110b | 110f | 2 | 11 |
| 110c | 110b | 3 | 21 |
| 110d | 110c | 4 | 41 |
| 110e | 110a | 3 | 36 |
| 110f | — | 1 | 1 |

The routes of Table 1 are constructed based on control plane messages for a metric-based IGP, such as EIGRP. For example, router 110f determines a cost of 1 to reach addresses on LAN 180 and advertises this in control plane messages to each of its neighbors: router 110a and router 110b on links 127 and 126, respectively. Those control plane messages each includes the network addresses of LAN 180, and the reported cost 1 of reaching addresses on LAN 180 as reported by the advertising router 110f.

For purposes of illustration, it is assumed that the network address of LAN 180 is 10.0.0.0/24. An IPv4 address is four octets of binary digits (bits). Each octet is 8 bits and represents decimal integers from 0 through 255. By convention, an IPv4 address is written as four decimal integers, each in the range from 0 to 255, separated by dots. A range of contiguous addresses is represented by the first address in the range followed by a slash and a decimal value, called a mask, from 0 through 32 that indicates the number of leading bits that remain unchanged over the range, At receiving routers, each router adds the cost of traversing the link between itself and the advertising router, e.g., router 110f, to determine the cost of using that link. Thus router 110a adds link cost 30 of link 127 for a total cost of 31; router 110b adds link cost 10 of link 126 for a total cost of 11. There are other paths from router 110a to LAN 180, but these cost more and are not the best path available. Routers 110a and router 110b then advertise the reachability of LAN addresses 10.0.0.0/24 to their neighbors. Thus router 110a learns of a path to LAN 180 through link 121 to router 110b for a total cost of 36, and another path through link 125 to router 110e for a total cost of 51. The lowest cost path is through link 127 to router 110f. So router 110f is the successor for destination addresses 10.0.0.0/24.

There is another path from router 110a that is guaranteed to be loop free based on cost advertised by router 110b. The advertised cost from router 110b to destinations 10.0.0.0/24 is 11. Because the cost from router 110a to these same destinations is 31, the path from 110b with cost 11 can not go back through router 110a and thus is sure to be a loop free alternative. Therefore router 110b is a feasible successor from router 110a for destination addresses 10.0.0.0/24. However, router 110a is not a feasible successor from router 110b for destination addresses 10.0.0.0/24. Router 110a advertises a cost of 31 which is more than the cost 11 from router 110b to LAN 180. Therefore router 110a might be using a route back through router 110b and therefore might involve a loop. As it turns out, router 110a has a loop free path, but router 110b can not be assured of this with the information passed in the conventional advertising messages of EIGRP.

When link 127 fails, for any reason, router 110a loses its route to LAN 180. Because router 110a has a feasible successor in router 110b, router 110a immediately forwards all data packet traffic directed to LAN 180 over link 121 to router 110b instead of over the failed link 127.

However, when link 126 fails, for any reason, router 110b loses its successor and route to LAN 180 and has no feasible successor. Router 110b has no interim path to use to reach router LAN 180 and forward data packet traffic. Instead, router 110b sends out queries and waits for responses until an EIGRP process on all the routers converges on a new route (through link 121 to router 110a). In the meantime, for several milliseconds to seconds to minutes, data packet traffic received at router 110b for LAN 180 might be lost.

According to illustrated embodiments of the invention, all routers in network 100 include a fast-reroute process; i.e., router 110a, router 110b, router 110c, router 110d, router 110e, router 110f include fast re-route process 150a, fast re-route process 150b, fast re-route process 150c, fast re-route process 150d, fast re-route process 150e, fast re-route process 150f, respectively (collectively referenced hereinafter as fast re-route process 150). In some embodiments one or more routers include fewer than all steps, or include no steps, of fast re-route process 150. The fast re-route process 150 processes standard and modified routing protocol messages that provide not only a router address, but also a repair address to use when a particular link becomes unavailable, due to problems either at the link or on the node communicating via that link.

3.0 Data Structures

FIG. 2A illustrates an example modified routing protocol Hello message 210. Hello message 210 is a control plane message that is sent only to a neighbor on a direct link that has no intervening intermediate network node. Hello messages are used in EIGRP to discover adjacent routers. Hello messages are not forwarded by the recipient node according to the EIGRP protocol. Hello message 210 includes an adjacent address field 212 and a repair address field 215.

The adjacent address field 212 holds data that indicates a network address for the router that sends the Hello message 210, such as a loop back address for a router or an interface address for a router that has different addresses for different interfaces.

The repair address field 315 holds data that indicates a repair address to reach the router when the direct link over which the Hello message was received is unavailable. This repair address will not be advertised as reachable over the direct link. Thus, the repair address is sometimes called the not via (notvia) address. The repair address is reachable only through other links to other interfaces on the router that sent the Hello message 215. The repair address indicated in field 215 is used with a tunneling protocol, as described in more detail below. A conventional EIGRP Hello message is easily modified to include the repair address field 215 as a type, length, value (TLV) field or a type value (TV) field, in which the type portion holds data that indicates the value portion holds a value for a repair address.

Because it is common to assign addresses for various portions of a network as contiguous addresses, such as contiguous IPv4 addresses, it is advantageous to select a repair address from a pool of addresses that is not within a range of addresses advertised for network nodes. For example, if network addresses for network nodes in network 100 are normally selected from a range indicated by 10.0.0.0/8, then the repair address is selected from a pool of addresses outside this range, e.g., from 192.168.0.0/8.

Other data fields well known in the art to include in a Hello message may be included in various embodiments but are not shown in FIG. 2A.

Although data fields in messages are shown in FIG. 2A and subsequent figures as contiguous portions thereof in a particular order for purposes of illustration, in some embodiments one or more fields or portions of those fields occur in a different order or one or more portions are omitted.

FIG. 2B illustrates a routing protocol update message 220. Update message 220, also called a route advertisement message in EIGRP, or simply advertisement, includes an advertised reachable address field 222 and a reported cost field 224. In some embodiments, the reported cost field 224 is omitted or contains a value that indicates no route is being advertised to the receiving router. The reachable address field 222 holds data that indicates an address or range of addresses reachable from the sending node at a uniform cost. The reported cost field 224 holds data that indicates the lowest cost to reach the address or range of addresses indicated in the reachable address field 222, as determined by the node that sends the update message 220. Other data fields well known in the art to include in an update message may be included in various embodiments but are not shown in FIG. 2B.

FIG. 2C illustrates an example modified routing protocol update message 230. Modified update message 230 includes an advertised reachable address field 222 and a reported cost field 224, as described above, and also a repair address field 232. The advertised reachable address field 222 and a reported cost field 224 are as described above for update message 220 in FIG. 2B. The repair address field 232 holds data that indicates a repair address to use to reach the addresses in the address field 222 when a communication link to the node that sends the modified update message 230 is unavailable. The repair address indicated in field 232 is used with a tunneling protocol, as described in more detail below. Other data fields well known in the art to include in an update message may be included in various embodiments but are not shown in FIG. 2C.

Figure 3:
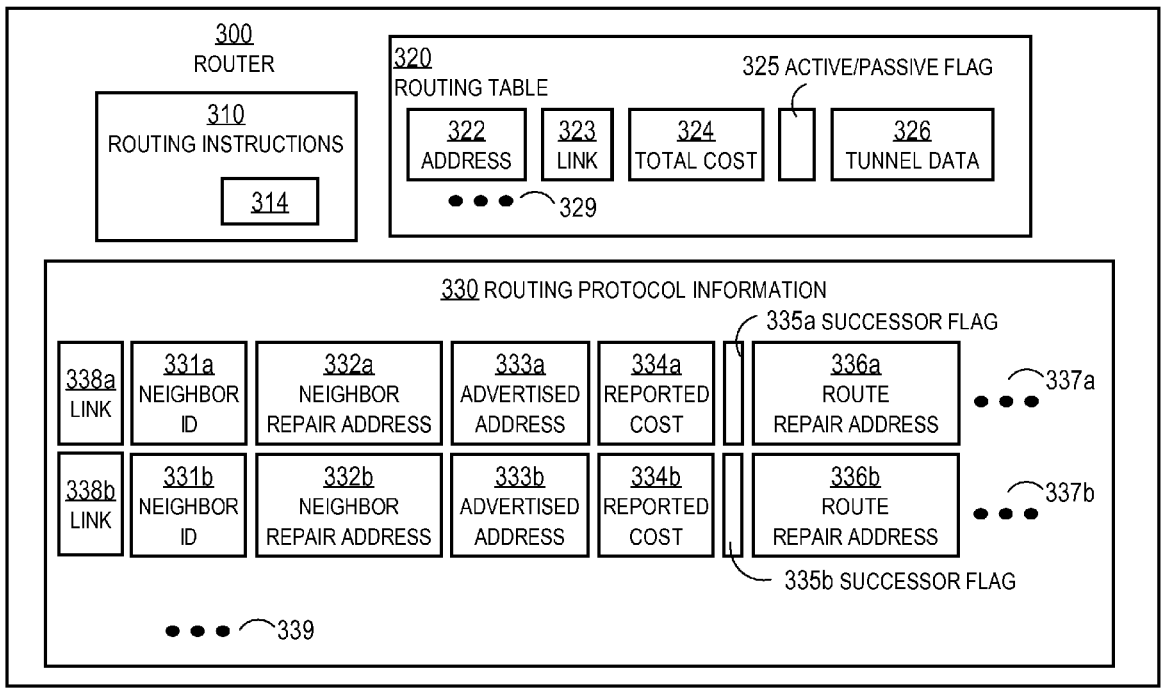
FIG. 3 illustrates an example router with a fast re-route process.

FIG. 3 illustrates an example router 300 with a fast re-route process. Router 300 includes routing instructions 310, a routing table 320, and routing protocol information 330.

The routing instructions 310 are executed on one or more processors, such as a general purpose processor executing sequences of instructions that cause the processor to perform the routing process. According to embodiments of the invention, routing instructions include fast re-routing instructions 314 described in more detail below with respect to FIG. 4A, FIG. 4B and FIG. 4C. The routing instructions 310 cause the one or more processors to store and retrieve information in the routing table 320 based on information received in one or more routing protocol update messages that are stored in a routing protocol information data structure 330.

The routing table 320 is a data structure that includes for each destination that can be reached from the router 300, an address field 322, a link field 323 and zero or more attribute fields. In the illustrated embodiment, the attributes fields include a total cost field 324, an active/passive flag field 325 and tunnel data field 326. Fields for other destinations in routing table 320 are indicated by ellipsis 329.

The address field 322 holds data that indicates an address or range of addresses that serve as a layer 3 destination of a data packet, such as an IP header destination address. For example, data indicated the LAN addresses 10.0.0.0/24 is inserted into address field 322. The link field 323 holds data that indicates a link on router 300 to which to direct a data packet with an IP destination address in the range indicated by the data in field 322. In various embodiments, on router 110b, link field 323 holds data that indicates link 126 or the network interface on router 110b connected to link 126 or the network address of the node at the other end of the link, e.g., the network address of router 110f. The total cost field 324 holds data that indicates total cost to reach the destination indicated in address field 322. For example, on router 110b, total cost field 324 holds data that indicates the total cost metric to reach LAN 180 is 11. The active/passive flag field 324 holds data that indicates whether a route is settled (passive) or actively being determined by sending queries. An active indication signifies that a route to that destination is not currently available and is actively being determined based on queries sent and query responses awaited. A passive indication signifies that a route to that destination is settled and currently available.

The tunnel data field 324 holds data that indicates whether data packets should be encapsulated in a tunneling protocol and sent to a repair address, as described in more detail below with reference to FIG. 4C. In some embodiments, the tunnel data field 326 includes data that indicates a pointer to a different data structure where the detailed tunnel information is stored.

The routing protocol information data structure 330 is a data structure that includes, for each destination received in a routing protocol update message, a link field (e.g., link fields 338a, 338b, collectively referenced hereinafter as address fields 338); a neighbor identifier (ID) field (e.g., neighbor ID fields 331a, 331b, collectively referenced hereinafter as neighbor ID fields 331); a neighbor repair address field (e.g., neighbor repair address fields 332a, 332b, collectively referenced hereinafter as neighbor repair address fields 332); an advertised address field (e.g., advertised address fields 333a, 333b, collectively referenced hereinafter as address fields 333); a reported cost field (e.g., reported cost fields 334a, 334b, collectively referenced hereinafter as reported cost fields 334); local successor flag fields 335a, 335b (collectively referenced hereinafter as local successor flag fields 335) and a route repair address field (e.g., route repair address fields 336a, 336b, collectively referenced hereinafter as route repair address fields 336). Address, cost, successor and repair address fields for other advertised addresses from the same neighbor are indicated by ellipses 337a and 337b. Fields for other neighbors in routing protocol information data structure 330 are indicated by ellipsis 339.

Data structures depicted in FIG. 3 may be formed in any method known in the art, including using portions of volatile memory, or non-volatile storage on one or more nodes, in one or more files or in one or more databases accessed through a database server, or some combination. Although data structures 320, 330 are shown as integral blocks with contiguous fields, e.g. field 326, in a particular order for purposes of illustration, in other embodiments one or more portions of fields and data structures 320, 330 are stored in a different order or in different separate data structures on the same or different multiple nodes that perform the functions of router 300.

Fast re-route process 150 includes instructions 314 and one or more fields in routing table 320 and routing protocol information 330 data structures, such as tunnel data 326 and repair address fields 332 and 336.

4.0 Method

FIG. 4A, FIG. 4B and FIG. 4C illustrate at a high level an example fast re-route process 400 on a local router, e.g., router 110b. Although steps in FIG. 4A, FIG. 4B and FIG. 4C are show in a particular order for purposes of illustration, in other embodiments, one or more steps, or portions thereof, may be performed in a different order or overlapping in time, in series or in parallel on one or more processors, or one or more steps may be omitted or added, or changed in some combination of ways. For example, the sequence of branch points (steps 406, 410, 420, 424, 426, 428) can be thought of as branches from a state machine or separate interrupt processors rather than as a sequence of steps. In some embodiments, method 400 is stored as instructions 314 on router 300.

In step 402 a self direct address for the router is determined to be used as an address on direct links with neighbor routers. Also during step 402 a self repair address is determined to be used to connect to the local router by a neighbor when a particular direct link becomes unavailable. In some embodiments, the same self direct address is used on two or more direct links; and in some embodiments a different self direct address is used on each different network interface that is directly linked to a neighbor router. In the illustrated embodiment, a different self repair address is determined for each network interface that is directly linked to a neighbor. Step 402 includes sending in a non-forwarded Hello message to each neighbor, both a self direct address and a self repair address for the direct link to the neighbor. For example, the self direct address and the self repair address are sent in modified routing protocol Hello message 210 depicted in FIG. 2A, in field 212 and field 215, respectively. As described in more detail with reference to step 412, the receiving router stores the repair address in association with the link to that neighbor, e.g., in a routing protocol information data structure 330.

In some embodiments, the self direct address and self repair address are received as configuration data during step 402. Any method may be used to receive this configuration data. For example, in various embodiments, the data is included as a default value in software instructions, is received as manual input from a network administrator on the local or a remote node, is retrieved from a local file or database, or is sent from a different node on the network, either in response to a query or unsolicited, or the data is received using some combination of these methods.

For purposes of illustration it is assumed that self direct addresses for routers 110 in network 100 are selected from a pool of addresses in the range 10.0.0.0/16 and that router 110a receives a self direct address of 10.0.1.0, such as from a Dynamic Host Configuration Protocol (DHCP) offer, well known in the art. It is further assumed that self repair addresses are configured from a pool of addresses in the range 192.168.0.0/16 and that a self repair address for each of the network direct link 121, link 125 and link 127 at router 110*a* are as listed in Table 2. In some embodiments, these values are determined automatically as new neighbors connect to the router 110*a* during step 402 from a pool 192.168.1.0/24. In some embodiments the pool 192.168.1.0/24 is initially configured on router 110*a* manually.

TABLE 2

Example self repair addresses determined at router 110a.

| link | Self direct address | Self repair address |
|---|---|---|
| 121 | 10.0.1.0 | 192.168.1.1 (A!B) |
| 125 | 10.0.1.0 | 192.168.1.2 (A!E) |
| 127 | 10.0.1.0 | 192.168.1.3 (A!F) |

The example self repair address 192.168.1.1 for link 121 to router 110*b* at router 110*a* may be called the "address for router 110*a* not used on the direct link with router 110*b*," or, more simply the "address to reach router A notvia router B." This phrase is herein designated by the symbol "A!B," which is read "A notvia B." Table 2, and subsequent references to example repair addresses will often be followed by the symbolic designation.

In the illustrated embodiments, these addresses are included in modified EIGRP Hello messages send over the various direct links. For example, a modified EIGRP Hello message sent over direct link 121 to router 110*b* indicates the self direct address of 10.0.1.0 in an adjacent address field 212 and the self repair address of 192.168.1.1 (A!B) in the repair address field 215. Similarly, a modified EIGRP Hello message sent over direct link 125 to router 110*e* indicates the self direct address of 10.0.1.0 and the self repair address of 192.168.1.2 (A!E); and, a modified EIGRP Hello message sent over direct link 127 to router 110*f* indicates the self direct address of 10.0.1.0 and the self repair address of 192.168.1.3 (A!F).

In step 404, an update message is sent to each neighbor indicating the repair addresses for the other direct links, only, are reachable on the direct link to that neighbor. The repair address for the link to that neighbor is not advertised as reachable over the link to that neighbor. As described in more detail with reference to step 422, the receiving router stores the reachable repair address in association with the link to the neighbor that sent the update message, e.g., in a routing protocol information data structure 330.

For example, an update message 220 is sent from router 110*a* to router 110*b* over direct link 121; and the update message 220 includes in the reachable address field 222 data that indicates the repair address 192.168.1.2 for link 125 (A!E) and the repair address 192.168.1.3 for link 127 (A!F). It is significant to note that the repair address 192.168.1.1 for data link 121 (A!B) is not included in the reachable address field 222. Because both of the addresses included in the reachable address field 222 are located on the sending router 110*a*, the cost metric indicated in reported cost field 224 is zero. As a result of receiving these update messages, these addresses are forwarded by the recipient routers and thus are propagated from router 110*b* to router 110*f* and to router 110*c* which forwards it to router 110*d* which forwards it to router 110*e*, and finally back to router 110*a*.

In step 406 it is determined whether a tunneled data packet directed to a self repair address is received. If so, control passes to step 408 to strip off the tunnel header and forward only the tunnel payload.

For example, if router 110*a* receives a tunneled data packet directed to repair address 192.168.1.2 (A!E) over link 121 (such a tunneled data packet would not come over link 125 because that repair address 192.168.1.2 is never advertised as reachable over link 125, as described below), then control passes to step 408. As described in more detail below, if router 110*e* has a data packet for address 10.0.0.7 in LAN 180, it is routed through its successor for that address, which is router 110*a*. If link 125 is unavailable and there is no feasible successor for destination 10.0.0.7 at router 110*e* (and if router 110*b* were not a feasible successor for router 110*a* to LAN 180), then router 110*e* encapsulates the data packet for destination 10.0.0.7 in a tunneling protocol and sends the tunneled data packet to the repair address 192.168.1.2 of the unavailable link 125. This address has been advertised in an update message over link 121 (in the normal reachable address field 222 and not in the repair address field 232) and is propagated by router 110*b* to router 110*c* to router 110*d* to router 110*e*. Therefore router 110*e* knows to send the tunneled data packet to router 110*d* which forwards it to router 110*c* which forwards it to router 110*b* which forwards it to router 110*a*.

In step 408, router 110*a* strips off the tunnel header and finds the data packet received by router 110*e* for destination address 10.0.0.7. That data packet is then forwarded to the successor for LAN 180, which is router 110*f*, in steps 428 and 498, described in more detail below. Thus a data packet, which might have been dropped by router 110*e* when link 125 first becomes unavailable, is successfully forwarded even before the EIGRP processes on the nodes of network 100 converge on new routes.

The following steps describe the preferred processing to forward repair addresses propagated in EIGRP to achieve the desired result in the illustrated embodiment. In the following, it is further assumed for purposes of illustration that router 110*b* has determined the direct address and repair addresses listed in Table 3.

TABLE 3

Example self repair addresses determined at router 110b.

| link | Self direct address | Self repair address |
|---|---|---|
| 121 | 10.0.2.0 | 192.168.2.1 (B!A) |
| 122 | 10.0.2.0 | 192.168.2.2 (B!C) |
| 126 | 10.0.2.0 | 192.168.2.3 (B!F) |

If it is determined in step 408 that a received data packet is not a tunneled data packet directed to a self repair address, then control passes to step 410. In step 410 it is determined whether a received data packet is a routing protocol Hello message with a repair address. If not, control passes to step 420. If so, control passes to step 412.

In step 412 the repair address is associated with the direct link to the neighbor that sent the Hello message. For example, the data in the adjacent address field 212 of the Hello message is inserted into the neighbor ID field 331 in the routing protocol information data structure 330 for the link indicated in field 338 that represents the direct link over which the Hello message is received; and the data in the repair address field 215 of the Hello message is inserted into the neighbor repair address field 332 of the same record in the data structure 330. Control then passes to step 432, described below, to update routes based on the received information.

If it is determined in step 410 that a received data packet is not a routing protocol Hello message with a repair address, then control passes to step 420. In step 420, it is determined whether a normal update message is received without a repair address, such as routing protocol update message 220. If not, control passes to step 424. If so, control passes to step 422.

In step 422 the reachable address and cost is associated with the direct link to the neighbor that sent the update message, as is normal EIGRP processing. For example, the data in the reachable address field 222 of the update message is inserted into the advertised address field 333 in the routing protocol information data structure 330 for the link indicated in field 338 that represents the direct link over which the update message is received; and the data in the reported cost field 224 of the update message is inserted into the reported cost field 334 of the same record in the data structure 330. Control then passes to step 432, described below with reference to FIG. 4B, to update routes based on the received information.

If it is determined in step 420 that a received data packet is not a normal update message without a repair address, then control passes to step 424. In step 424, it is determined whether a modified update message is received with a repair address, such as modified routing protocol update message 230. If not, control passes to step 426. If so, control passes to step 430 and following steps depicted in FIG. 4B to update routes based on the information received.

If it is determined in step 424 that a received data packet is not a modified update message with a repair address, then control passes to step 426. In step 426, it is determined whether a direct link with a neighbor has just failed. If not, control passes to step 428. If so, control passes to step 470 and following steps depicted in FIG. 4C to initiate fast re-route of data packets while the network converges on new routes. As described in more detail below, these steps condition the routing table, e.g., routing table 320, to forward data packets to a feasible successor or tunnel the data packets to a repair address to avoid the failure.

If it is determined in step 426 that a direct link with a neighbor has not just failed, then control passes to step 428. In step 428, it is determined whether any other type of data packet is received. If not, control passes to back to step 402. If so, control passes to step 498.

In step 498 the data packet is forwarded or tunneled based on the data in the routing table, e.g., routing table 320. For example, the destination address in the data packet is determined and a record is found in the routing table 320 in which the contents of the address field 322 matches the destination address of the data packet. If the tunnel data 326 indicates a tunnel is in effect for that address, the data packet is encapsulated in a tunneling protocol and directed to a repair address also indicated by the tunnel data 326. The tunneled data packet is then forwarded on the link indicated in the link field 323. If the tunnel data indicates a tunnel is not in effect, then the data packet itself is forwarded on the link indicated in the link field 323. Any suitable tunneling protocol may be used. For example, in some embodiments the tunneling protocol is IP in IP described in request for comment (RFC) 1853 available at the domain ietf.org of the Internet Engineering Task Force (IETF); in other embodiments the tunneling protocol is Generic Route Encapsulation (GRE) described in RFC 1701 also available at domain ietf.org. Control then passes back to step 402 to repeat the process with new messages received.

As stated above, if it is determined in step 424 that a received data packet is a modified update message with a repair address, then control passes to step 430 and subsequent steps depicted in FIG. 4B.

In step 430, the reachable address and cost and repair address is associated with the direct link to the neighbor that sent the modified update message. For example, as in step 422, the data in the reachable address field 222 of the update message is inserted into the advertised address field 333 in the routing protocol information data structure 330 for the link indicated in field 338 that represents the direct link over which the update message is received; and the data in the reported cost field 224 of the update message is inserted into the reported cost field 334 of the same record in the data structure 330. Unlike step 422, the data in the repair address field 232 of the modified update message 230 is inserted into the route repair address field 336 of the same record in the data structure 330. Control then passes to step 432.

In step 432, the routing table is updated based on the Hello and update messages received; and any tunnels for passive routes are disestablished. When a link to a neighbor fails, or an update message is received that indicates a route to a particular destination (or range of destinations) is not available, the active/passive flag 325 is set to indicate active. Following normal procedures for active routes, as is well known in the art, one or more routing protocol query messages are sent and responses awaited. When the responses are received and a new route is determined using well known procedures, the routing table entry for that destination address (or range of addresses) is updated, for example with new values in the link field 323 and in the total cost field 324, and then the active/passive flag 325 is set to passive. A tunnel is used to send data packets to a repair address for an active route, but not for a passive route. When a route is changed from active to passive, the tunnel data 326 is changed to indicate no tunnel. In embodiments using some tunneling protocols, the tunnel is disestablished during step 432 by sending one or more messages according to the tunneling protocol, as is well known in the art. GRE and IP in IP do not require extra traffic to establish or disestablish tunnels. Control then passes to step 434.

In step 434, it is determined whether all routes are passive. If not, control passes directly to step 440. If all routes are passive, control passes first to step 436. In step 436, it is determined whether a repair address for each route is reachable in the routing table. If so, control passes on to step 440. If not, control passes to step 438.

In step 438, a correction is made to allow fast re-routing to a destination for which a repair address is not reachable. In step 438, a repair address of the neighbor that advertised the destination address is used as the repair address. For example, if the route repair address in field 336a is not listed in the advertised address field 333 of any record, then it is not in the routing table 320 and there is no link to use to tunnel to that repair address. In this case, the tunnel should be built to the repair address of the neighbor that sent the repair address, e.g., the tunnel is to be built to the repair address indicated in the associated neighbor repair address field 332a. In the illustrated embodiment, this is accomplished by inserting the neighbor repair address in field 332 into the route repair address field 336 for the repair address that is not reachable. Control then passes to step 440.

In step 440, it is determined which destination address (or range of addresses) should be advertised to a neighbor. For example, a destination address (or range) affected by a Hello message or a routing protocol update messages is selected for advertising in step 440. Control then passes to step 442.

In step 442 it is determined if the destination address or range is received in an update message with a repair address of a neighbor of the local router. If so, control passes to step 444, which does not forward an update with that destination. For example, after a modified Hello message, router 110a learns of neighbor 110b with a direct address of 10.0.2.0 and a repair address of 192.168.2.1. When a modified update message 230 is received at router 110a with a reachable address range of LAN 180, e.g., 10.0.0.0/24, and a repair address of 192.168.2.1 in the repair address field 232, that update message is not forwarded to router 110b over link 121. Control passes back to step 446.

In step 446, it is determined whether there is a feasible successor for a destination. If not, control passes to step 450. If so, control passes to step 448.

In step 448, an update message is sent with a repair address of the feasible successor. For example, router 110a has a feasible successor for destination 10.0.0.0/24 on LAN 180, which is router 110b. Router 110b has indicated in a Hello message to router 110a a direct address of 10.0.2.0 and a repair address of 192.168.2.1 (B!A). The repair address 192.168.2.1 (B!A) is advertised as reachable over link 122 and over link 126 but not over link 121. Router 110a advertises in an update message 230 to router 110e a reachable address of LAN 180, 10.0.0.0/24, in reachable address field 222 and a repair address of 192.168.2.1 (B!A), in repair address field 232. Thus, router 110e is informed that if link 125 to router 110a becomes unavailable, router 110e should tunnel data packets for LAN 180 addresses 10.0.0.0./24 to repair address 192.168.2.1 (B!A). Such a tunnel terminates on router 110b. Control then passes back to step 402.

If it is determined, in step 446, that there is no feasible successor for a destination, then control passes to step 450. In step 450 it is determined whether the destination is a neighbor. If not control passes to step 452, described below. If so, control passes to step 458.

In step 458, the destination (or range) is sent in a modified update message with a repair address for the direct link over which the update is sent. For purposes of illustration it is further assumed that router 110f determines the self direct address and self repair addresses listed in Table 4.

TABLE 4

Example self repair addresses determined at router 110f.

| link | Self direct address | Self repair address |
|------|---------------------|---------------------|
| 126  | 10.0.6.0            | 192.168.6.1 (F!B)   |
| 127  | 10.0.6.0            | 192.168.6.2 (F!A)   |

In step 458 the destination addresses 10.0.0.0./24 of LAN 180 which are neighbors of router 110f are advertised by router 110f. The destination address range 10.0.0.0./24 is indicated in reachable address field 222 and a cost of 1 is indicated in reported cost field 224 in all update messages. However, the repair address 192.168.6.1 (F!B) for direct link 126 to router 110b is indicated in repair address field 232 in a modified routing protocol update message 230 sent from router 110f to router 110b. In contrast, the repair address 192.168.6.2 (F!A) for direct link 127 to router 110a is indicated in repair address field 232 in a modified routing protocol update message 230 sent from router 110f to router 110a. Control then passes back to step 402.

If it is determined, in step 450, that the destination is not a neighbor of the local router, then the destination is reachable through a successor and control passes to step 454. In step 454, the destination (or range) is sent in a modified update message with a repair address for the successor. For example, at router 110b the destination address range 10.0.0.0./24 of LAN 180 is reachable through successor router 110f. When advertised by router 110b, the destination address range 10.0.0.0./24 is indicated in reachable address field 222 and a cost of 11 is indicated in reported cost field 224 in all update messages. The repair address 192.168.6.1 (F!B) for direct link 126 of successor router 110f is indicated in repair address field 232 in modified routing protocol update messages 230 sent from router 110b to its neighbors, router 110a and router 110c. Control then passes back to step 402. Router 110c is then informed that if its route to LAN 180 through router 110b is lost when link 122 becomes unavailable, then router 110c can send data packets directed to LAN 180 in tunnels to repair address 192.168.6.1 (F!B), which has been advertised as reachable through router 110a to router 110e to router 110d to router 110c. Control then passes back to step 402.

If it is determined, in step 426 depicted in FIG. 4A, that a direct link with a neighbor has just failed, control passes to step 470 and following steps depicted in FIG. 4C. These steps condition the routing table, e.g., routing table 320, to forward data packets to a feasible successor or tunnel the data packets to a repair address to avoid the failed direct link. It is assumed for purposes of illustration that link 126 has failed.

In step 470, the next destination (or range) that was reachable in the local routing table through the failed direct link to a neighbor is selected. For example, at router 110b, LAN 180 addresses 10.0.0.0/24 were reachable through link 126 in the routing table, e.g., routing table 320. Thus the destination range 10.0.0.0/24 is selected at router 110b during step 470. In some embodiments, step 470 includes setting the associated active/passive flag field 325 to indicate the route is active.

In step 472, it is determined whether there is a feasible successor for the destination. If so, control passes to step 474. In step 474, the failed direct link in the routing table is replaced with a link to the feasible successor. For example, if there were a feasible successor, then the link indicated in the link field 323 associated with the address field 322 that indicates the range 10.0.0.0/24 in the routing table 320 is replaced with data that indicates a link with the feasible successor. If it is assumed for purposes of illustration that, at router 110a, the link 127 failed, then data indicating link 127 in link field 323 is replaced with data indicating link 121 to the feasible successor route 110b for the destination range 10.0.0.0/24 of LAN 180. This step is currently performed by EIGRP. Control then passes to step 490.

In step 490, it is determined whether another destination is reachable through the failed link. If so, control passes back to step 470 to select the next destination address or range. If not, control passes to step 428 depicted in FIG. 4A to determine whether a data packet is received.

If it is determined, in step 472, that there is a not a feasible successor for the destination, then control passes to step 480. In step 480, it is determined whether there is a repair address reachable for that destination or range. If not, control passes to step 482. For example, the selected destination address is found in field 333 in a record in the routing protocol information data structure 330 without an associated repair address in field 336, or with a repair address that is not listed in the routing table (e.g., not indicated in any address field 322 in routing table 320). In step 482, the link is simply removed and no fast re-route is offered. Data packets directed to that destination might be dropped. Control then passes to step 490. In some embodiments, step 482 is omitted and control passes directly to step 490.

If it is determined, in step 480, that there is a repair address reachable for that destination or range, then control passes to step 484. For example, the selected destination address is found in field 331 or field 333 in a record in the routing protocol information data structure 330 with an associated repair address in field 332 or field 336, respectively, that is listed in the routing table 320.

It is assumed for purposes of illustration that destination range 10.0.0.0/24 is found by router 110b in field 333 in a record based on an advertisement received from router 110f. The record indicates the link 126 to router 110f in field 338a, the advertised address 10.0.0.0/24 in field 333a, the reported cost of 1 in field 334a, data in field 335a indicating that router 110f is a successor for this address, and route repair address 192.168.6.1 (F!B) in field 336a (because the destination is directly connected to the advertising router 110f). Thus there is a repair address of 192.168.6.1 (F!B) associated with the destination address range 10.0.0.0/24. It is then determined whether the repair address is reachable. That is, it is determined whether there is an entry in the routing table 320 for the repair address. It is assumed for purposes of illustration that a route to repair address 192.168.6.1 is in the routing table 320, based on an advertisement from router 110f propagated to router 110*a* and from router 110*a* to router 110*b*. Thus another record in routing table 320 holds the repair address 192.168.6.1 in field 322, the link 121 to router 110*a* in field 323, a total cost of 56 in field 324, and data indicating the route is passive in field 325. Thus the repair address is determined to be reachable in step 480 and control passes to step 484.

In step 484, it is determined whether there is an extant tunnel to the repair address. If so, control passes directly to step 488. If not, control passes first to step 486. In step 486, a tunnel is created to repair address 486. For example, a tunnel header is generated to carry IP data packets as a payload of a tunneled data packet directed to repair address 192.168.6.1 (F!A) and sent out on data link 121. Control then passes to step 488. In some embodiments, a tunnel is never already available when a link newly fails; so step 484 is omitted and control passes directly from step 480 to step 486.

In step 488, the routing table is updated with tunnel information. For example, at router 110*b* in the routing table record with the address 10.0.0.0/24 in the destination address field 322, the data indicating link 126 in link field 323 is replaced with data indicating link 121. The tunnel data field 326 is changed to indicate there is a tunnel and to indicate the header for the tunnel protocol. The tunnel header includes a destination address that indicates the repair address 192.168.6.1 (F!B). Control then passes to step 490 to determine if there is another destination affected by the failed link.

Using method 400, messages 210 and 230 and data structures 320 and 330, fast re-routing of data packets is available during network convergence in EIGRP networks for many more failure modes than provided only by feasible successors.

Consider what happens at router 110*e* to protect against failure of its link 125 with router 110*a* to reach LAN 180. Router 110*e* has router 110*a* as a successor for LAN 180 (total cost 36) and no feasible successor (because the advertised cost from its other neighbor, router 110*d*, is 41). Router 110*a* has router 110*f* as a successor for LAN 180 (total cost 31) and router 110*b* as feasible successor (advertised cost of 11).

During step 402 on each router, router 110*a*, router 110*b* and router 110*f* determine the direct and repair addresses indicated above in Table 2, Table 3 and Table 4, respectively. It is further assumed that router 110*e* determines the direct and repair addresses in Table 5.

TABLE 5

Example self repair addresses determined at router 110e.

| link | Self direct address | Self repair address |
|------|---------------------|---------------------|
| 124  | 10.0.5.0            | 192.168.5.1 (E!D)   |
| 125  | 10.0.5.0            | 192.168.5.2 (E!A)   |

It is further assumed that router 110*c* and router 110*d* have self direct addresses of 10.0.3.0 and 10.0.4.0, respectively; and that router 110*d* has a repair address for link 124 of 192.168.4.2. These self direct addresses and self repair addresses are sent in modified Hello messages to the corresponding neighbors of each router during step 402 on each router. During step 404 on router 110*a*, router 110*a* advertises its repair address for link 121 with router 110*b*, e.g., 192.168.1.1, through normal update messages 220 to router 110*e* and router 110*f*. During step 412 on each router, the reachability of address 192.168.1.1 is propagated to the remainder of the routers in network 110. During step 404 on router 110*b*, router 110*b* advertises its repair address for link 121 with router 110*a*, e.g., 192.168.2.1, through normal update messages 220 to router 110*c* and router 110*f*; and hence, during step 412 on each successive router, to the remainder of the routers in network 100. This advertisement is received at router 110*e* from router 110*d*. The routing protocol information data structure 330 at router 110*e* then includes the portion of the records indicated in Table 6a.

TABLE 6a

Example Routing Protocol Information at router 110e at early time.

| Field: | | |
|---|---|---|
| Link | 125 | 124 |
| Neighbor ID | 10.0.1.0 | 10.0.4.0 |
| Neighbor repair address | 192.168.1.2 (A!E) | 192.168.4.2 (D!E) |
| Advertised address | 192.168.1.1 (A!B) | 192.168.4.1(D!C) |
| Reported cost | 0 | 0 |
| Successor flag | successor | successor |
| Route repair address | — | — |
| Advertised address | 192.168.1.3 (A!F) | |
| Reported cost | 0 | |
| Successor flag | successor | |
| Route repair address | — | |

During step 446 and step 448 on router 110*a*, router 110*a* advertises to router 110*e* that LAN 180 is reachable with a repair address 192.168.2.1 (B!A) of its feasible successor, router 110*b*, learned in the modified Hello message 210 router 110*a* received from router 110*b* during step 402 on router 110*b*. The routing protocol information data structure 330 at router 110*e* then includes the portion of the records indicated in Table 6b.

TABLE 6b

Example Routing Protocol Information at router 110e at later time.

| Field | Router 110a record | Router 110d record |
|---|---|---|
| Link | 125 | 124 |
| Neighbor ID | 10.0.1.0 | 10.0.4.0 |
| Neighbor repair address | 192.168.1.2 (A!E) | 192.168.4.2 (D!E) |
| Advertised address | 192.168.1.1 (A!B) | 192.168.4.1 (D!C) |
| Reported cost | 0 | 0 |
| Successor flag | successor | successor |
| Route repair address | — | — |
| Advertised address | 192.168.1.3 (A!F) | 192.168.2.1 (B!A) |
| Reported cost | 0 | 30 |
| Successor flag | successor | successor |
| Route repair address | — | — |
| Advertised address | 10.0.0.0/24 | 192.168.1.2 (A!E) |
| Reported cost | 31 | 55 |
| Successor flag | successor | successor |
| Route repair address | 192.168.2.1 (B!A) | — |
| Advertised address | | 10.0.0.0/24 |
| Reported cost | | 41 |
| Successor flag | | no |
| Route repair address | | C!D |

During step 440 on router 110*e*, router 110*e* determines to advertise to router 110*d* the destination range 10.0.0.0/24 for LAN 180 just learned from router 110*a*. Because this address is not reachable by a feasible successor and is not a neighbor of router 110*e*, router 110*e* advertises this address during step 454 with a repair address of the successor, router 110*a*, which is 192.168.1.2 (A!E), as seen in Table 6b. The advertised cost is 36 for a total cost from router 110d of 51. Router 110d will store this information in its routing protocols information data structure; but router 110d already has a lower cost (41) route to LAN 180 through router 110c, as shown in Table 1. Thus router 110d does not forward the advertisement of reachability for 10.0.0./24 to router 110c, according to the split horizon rule of EIGRP. Similarly router 110e gets an alternative path to LAN 180 through router 110d, but this is not a successor or feasible successor and is not advertised to router 110a.

The routing table on router 110e includes the portions of the records shown in Table 7a. The route to LAN 180 goes through the successor over link 125 to router 110a and not through link 124 to router 110d, which is more costly.

TABLE 7a

Example Routing Table at router 110e at later time.

| Field | record | record | record | record | record | record | record |
|---|---|---|---|---|---|---|---|
| Address | 10.0.1.0 | 10.0.4.0 | 192.168.1.1 | 192.168.4.1 | 10.0.0.0/24 | 192.168.2.1 | 192.168.1.2 |
| Link | 125 | 124 | 125 | 124 | 125 | 124 | 124 |
| Total Cost | 5 | 15 | 5 | 15 | 36 | 45 | 70 |
| Active/passive flag | passive | passive | passive | passive | passive | passive | passive |
| Tunnel data | none | none | none | none | none | none | none |

If the link 125 between router 110a and router 110e fails, during step 470 on router 110e, router 110e determines that destinations 10.0.1.0, 192.168.1.1 and 10.0.0.0/24 are affected, marks them as active, and selects the next one for determining a fast re-route. For purposes of illustration, it is assumed that destination range 10.0.0.0/24 on LAN 180 is selected.

During step 472 on router 110e, it is determined from table 6b that there is no feasible successor to this destination range and control passes to step 480. During step 480 on router 110e, it is determined based on Table 6b that the repair address for LAN 180 destination range 10.0.0./24 is 192.168.2.1 (B!A) and that this address range is in the routing table as reachable through link 124; so control passes to step 484. During step 484 on router 110e it is determined that there is not a tunnel already set up for repair address 192.168.2.1 (B!A); so control passes to step 486. In step 486 a tunneling protocol header is generated directed to destination 192.168.2.1 and any tunneling protocol establishment messages are sent. In step 488 on router 110e, the tunnel information is used to replace the contents of the routing table for the address range of LAN 180. The link data in field 323 is replaced with the link 124 that supports this tunnel. A similar result occurs for destination 10.0.1.0 (router 110a). In this case, during step 484 it is determined that there is an extant tunnel to the repair address and control passes directly to step 488. However, destination 192.168.1.1 does not have a repair address; so this destination does not have a tunnel formed. The routing table on router 110e then includes the portions of the records shown in Table 7b.

TABLE 7b

Example Routing Table at router 110e after failure of link 125.

| Field | record | record | record | record | record | record | record |
|---|---|---|---|---|---|---|---|
| Address | 10.0.1.0 | 10.0.4.0 | 192.168.1.1 | 192.168.4.1 | 10.0.0.0/24 | 192.168.2.1 | 192.168.1.2 |
| Link | 124 | 124 | unknown | 124 | 124 | 124 | 124 |
| Total Cost | unknown | 15 | unknown | 15 | unknown | 45 | 70 |
| Active/passive flag | active | passive | active | passive | active | passive | passive |
| Tunnel data | tunnel header directed to 192.168.2.1 (B!A) | none | none | none | tunnel header directed to 192.168.2.1 (B!A) | none | none |

Data packets received at router 110*e* (e.g., from a LAN, not shown, connected to router 110*e*) and directed to LAN 180 or router 110*a* are tunneled to router 110*b*, unpacked there and forwarded or consumed by router 110*b*. Thus data packets directed to LAN 180 are tunneled to router 110*b* via router 110*e* to router 110*d* to router 110*c* to router 110*b*. The tunnel header is stripped off at router 110*b* and forwarded over link 127 to router 110*f*, which is router 110*b*'s lowest cost to LAN 180. The total cost experienced by these data packets after leaving router 110*e* is 56 (45 in the tunnel to router 110*b* and 11 from router 110*a* to LAN 180).

Normal EIGRP processing eventually discovers a new route from router 110*e* to LAN 180 through router 110*d* even though route 110*d* was not a feasible successor. This route passes from router 110*e* to router 110*d* to router 110*c* to router 110*b* to router 110*f* to LAN 180. The total cost of this route is 56, as experienced while using the tunnel. The routes are marked passive and the tunnels are disestablished. The link 125 is removed from the routing protocol information data structure; extra routes are reported for link 124; and the routing table on router 110*e* includes the portions of the records shown in Table 7c router 110*e* and router 110*b*. Because there is no feasible successor, as determined during step 446 on router 110*a*, and the destination is reachable through a successor 110*f*, as determined during step 452, the repair address in the update message is the repair address for the successor which is 192.168.6.2 (F!A) as determined during step 454. During step 440 on router 110*e*, router 110*e* advertises the LAN 180 address in a modified update message 230 to router 110*d*. Because there is no feasible successor, as determined during step 446 on router 110*e*, and the destination is reachable through a successor 110*a*, as determined during step 452, the repair address in the update message is the repair address for the successor which is 192.168.1.2 (A!E) as determined during step 454.

The routing protocol information data structure 330 at router 110*e* then includes the portion of the records indicated in Table 8. This differs from Table 6b only in the route repair address for the LAN 180 address range 10.0.0.0/24 on link 125.

TABLE 7c

Example Routing Table at router 110e after failure of link 125 and subsequent convergence of network 110.

| Field | record | record | record | record | record | record | record |
|---|---|---|---|---|---|---|---|
| Address | 10.0.1.0 | 10.0.4.0 | 192.168.1.1 | 192.168.4.1 | 10.0.0.0/24 | 192.168.2.1 | 192.168.1.2 |
| Link | 124 | 124 | 124 | 124 | 124 | 124 | 124 |
| Total Cost | 70 | 15 | 85 | 15 | 56 | 45 | 70 |
| Active/passive flag | passive | passive | passive | passive | passive | passive | passive |
| Tunnel data | none | none | none | none | none | none | none |

To show some additional circumstances, it is assumed that network 100 has converged after losing link 126. Now consider what happens at router 110*e* to protect against failure of its link 125 with router 110*a* to reach LAN 180. Router 110*a* has a successor through router 110*f* but no longer has a feasible successor. Router 110*e* has router 110*a* as a successor for LAN 180 (total cost 36) and no feasible successor. Router 110*d* has router 110*e* as a successor for LAN 180 and no feasible successor. Router 110*b* has router 110*a* as a successor for LAN 180 and no feasible successor. Router 110*c* has router 110*b* as a successor for LAN 180 and no feasible successor.

During step 440 on router 110*f*, router 110*f* advertises the LAN 180 address 10.0.0.0/24 in a modified update message 230. Because there is no feasible successor, as determined during step 446 on router 110*f*, and the destination is directly connected to router 110*f*, as determined during step 450, the repair address in the update message is the repair address of the direct link 127 which is 192.168.6.2 (F!A) as determined during step 458. However, there is no other link from router 110*f* to the other routers on which to advertise that F!A is reachable. Therefore F!A is not reachable from any router in network 100 without link 126.

During step 440 on router 110*a*, router 110*a* advertises the LAN 180 address in a modified update message 230 to both

TABLE 8

Example Routing Protocol Information at router 110e in network without link 126.

| Field | Router 110a record | Router 110d record |
|---|---|---|
| Link | 125 | 124 |
| Neighbor ID | 10.0.1.0 | 10.0.4.0 |
| Neighbor repair address | 192.168.1.2 (A!E) | 192.168.4.2 (D!E) |
| Advertised address | 192.168.1.1 (A!B) | 192.168.4.1 (D!C) |
| Reported cost | 0 | 0 |
| Successor flag | successor | successor |
| Route repair address | — | — |
| Advertised address | 192.168.1.3 (A!F) | 192.168.2.1 (B!A) |
| Reported cost | 0 | 30 |
| Successor flag | successor | successor |
| Route repair address | — | — |
| Advertised address | 10.0.0.0/24 | 192.168.1.2 (A!E) |
| Reported cost | 31 | 55 |
| Successor flag | successor | successor |
| Route repair address | 192.168.6.2 (F!A) | — |
| Advertised address | | 10.0.0.0/24 |
| Reported cost | | 86 |
| Successor flag | | no |
| Route repair address | | C!D |

The routing table on router 110e includes the portions of the records shown in Table 9a. The route to LAN 180 goes through the successor over link 125 to router 110a and not through link 124 to router 110d, which is more costly.

TABLE 9a

Example Routing Table at router 110e in network without link 126.

| Field | record | record | record | record | record | record | record |
|---|---|---|---|---|---|---|---|
| Address | 10.0.1.0 | 10.0.4.0 | 192.168.1.1 | 192.168.4.1 | 10.0.0.0/24 | 192.168.2.1 | 192.168.1.2 |
| Link | 125 | 124 | 125 | 124 | 125 | 124 | 124 |
| Total Cost | 5 | 15 | 5 | 15 | 36 | 45 | 70 |
| Active/passive flag | passive | passive | passive | passive | passive | passive | passive |
| Tunnel data | none | none | none | none | none | none | none |

During step 434 on router 110e, it is determined that all routes are passive and control passes to step 436. In step 436 it is determined that the repair address 192.168.6.2 (F!A) is not in the routing table listed in Table 9a and is therefore not reachable. Control passes to step 438. In step 438, the repair address of the neighbor that advertised the destination address, in field 332, is used instead of the unreachable route repair address in field 336. Thus, during step 438 on router 110e, the unreachable repair address 192.168.6.2 (F!A) in the routing protocol information data structure is replaced with the repair address of router 110a for the direct link used to send the update message, which is 192.168.1.2 (A!E). Note that this repair address still differs from the repair address listed in Table 6b.

(A!E) and that this address range is in the routing table as reachable through link 124; so control passes to step 484. During step 484 on router 110e it is determined that there is not a tunnel already set up for repair address 192.168.1.2 (A!E); so control passes to step 486. In step 486 a tunneling protocol header is generated directed to destination 192.168.1.2 (A!E) and this information is used to replace the contents of the routing table for the address range of LAN 180 and the link data in field 323 is replaced with data indicating the link 124 that supports this tunnel. A similar result occurs for destination 10.0.1.0 (router 110a). In this case, during step 484 it is determined that there is an extant tunnel to the repair address and control passes directly to step 488. However, destination 192.168.1.1 does not have a repair address; so this destination does not have a tunnel formed. The routing table on router 110e then includes the portions of the records shown in Table 9b.

TABLE 9b

Example Routing Table at router 110e after failure of link 125 in network without link 126.

| Field | record | record | record | record | record | record | record |
|---|---|---|---|---|---|---|---|
| Address | 10.0.1.0 | 10.0.4.0 | 192.168.1.1 | 192.168.4.1 | 10.0.0.0/24 | 192.168.2.1 | 192.168.1.2 |
| Link | 124 | 124 | unknown | 124 | 124 | 124 | 124 |
| Total Cost | unknown | 15 | unknown | 15 | unknown | 45 | 70 |
| Active/passive flag | active | passive | active | passive | active | passive | passive |
| Tunnel data | tunnel header directed to 192.168.2.1 (A!E) | none | none | none | tunnel header directed to 192.168.2.1 (A!E) | none | none |

If the link 125 between router 110a and router 110e fails, during step 470 on router 110e, router 110e determines that destinations 10.0.1.0, 192.168.1.1 and 10.0.0.0/24 are affected, marks them as active, and selects the next one for determining a fast re-route. For purposes of illustration, it is assumed that destination range 10.0.0.0/24 on LAN 180 is selected.

During step 472 on router 110e, it is determined from table 6b that there is no feasible successor to this destination range and control passes to step 480. During step 480 on router 110e, it is determined based on Table 8 that the repair address for LAN 180 destination range 10.0.0./24 is 192.168.1.2

Data packets received at router 110e (e.g., from a LAN, not shown, connected to router 110e) and directed to LAN 180 or router 110a are tunneled to router 110a, unpacked there and forwarded or consumed by router 110a. Thus data packets directed to LAN 180 are tunneled to router 110a via router 110e to router 110d to router 110c to router 110b to router 110a. The tunnel header is stripped off at router 110a and tunnel payload forwarded over link 127 to router 110f, which is router 110a's only path to LAN 180. The total cost experienced by these data packets after leaving router 110e is 101 (70 in the tunnel to router 110a and 31 from router 110a to LAN 180).

Normal EIGRP processing eventually discovers a new route from router 110e to LAN 180 through router 110d even though route 110*d* was not a feasible successor. This route passes from router 110*e* to router 110*d* to router 110*c* to router 110*b* to router 110*a* to router 110*f* to LAN 180. The total cost of this route is 101, as experienced while using the tunnel. The routes are marked passive and the tunnels are disestablished. The link 125 is removed from the routing protocol information data structure; and extra routes are reported for link 124.

5.0 Implementation Mechanisms—Hardware Overview

FIG. 5 illustrates a computer system 500 upon which an embodiment of the invention may be implemented. The preferred embodiment is implemented using one or more computer programs running on a network element such as a router device. Thus, in this embodiment, the computer system 500 is a router.

Computer system 500 includes a communication mechanism such as a bus 510 for passing information between other internal and external components of the computer system 500. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). A sequence of binary digits constitutes digital data that is used to represent a number or code for a character. A bus 510 includes many parallel conductors of information so that information is transferred quickly among devices coupled to the bus 510. One or more processors 502 for processing information are coupled with the bus 510. A processor 502 performs a set of operations on information. The set of operations include bringing information in from the bus 510 and placing information on the bus 510. The set of operations also typically include comparing two or more units of information, shifting positions of units of information, and combining two or more units of information, such as by addition or multiplication. A sequence of operations to be executed by the processor 502 constitute computer instructions.

Computer system 500 also includes a memory 504 coupled to bus 510. The memory 504, such as a random access memory (RAM) or other dynamic storage device, stores information including computer instructions. Dynamic memory allows information stored therein to be changed by the computer system 500. RAM allows a unit of information stored at a location called a memory address to be stored and retrieved independently of information at neighboring addresses. The memory 504 is also used by the processor 502 to store temporary values during execution of computer instructions. The computer system 500 also includes a read only memory (ROM) 506 or other static storage device coupled to the bus 510 for storing static information, including instructions, that is not changed by the computer system 500. Also coupled to bus 510 is a non-volatile (persistent) storage device 508, such as a magnetic disk or optical disk, for storing information, including instructions, that persists even when the computer system 500 is turned off or otherwise loses power.

The term computer-readable medium is used herein to refer to any medium that participates in providing information to processor 502, including instructions for execution. Such a medium may take many forms, including, but not limited to, non-volatile media, volatile media and transmission media. Non-volatile media include, for example, optical or magnetic disks, such as storage device 508. Volatile media include, for example, dynamic memory 504. Transmission media include, for example, coaxial cables, copper wire, fiber optic cables, and waves that travel through space without wires or cables, such as acoustic waves and electromagnetic waves, including radio, optical and infrared waves. Signals that are transmitted over transmission media are herein called carrier waves.

Common forms of computer-readable media include, for example, a floppy disk, a flexible disk, a hard disk, a magnetic tape or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read.

Information, including instructions, is provided to the bus 510 for use by the processor from an external terminal 512, such as a terminal with a keyboard containing alphanumeric keys operated by a human user, or a sensor. A sensor detects conditions in its vicinity and transforms those detections into signals compatible with the signals used to represent information in computer system 500. Other external components of terminal 512 coupled to bus 510, used primarily for interacting with humans, include a display device, such as a cathode ray tube (CRT) or a liquid crystal display (LCD) or a plasma screen, for presenting images, and a pointing device, such as a mouse or a trackball or cursor direction keys, for controlling a position of a small cursor image presented on the display and issuing commands associated with graphical elements presented on the display of terminal 512. In some embodiments, terminal 512 is omitted.

Computer system 500 also includes one or more instances of a communications interface 570 coupled to bus 510. Communication interface 570 provides a two-way communication coupling to a variety of external devices that operate with their own processors, such as printers, scanners, external disks, and terminal 512. Firmware or software running in the computer system 500 provides a terminal interface or character-based command interface so that external commands can be given to the computer system. For example, communication interface 570 may be a parallel port or a serial port such as an RS-232 or RS-422 interface, or a universal serial bus (USB) port on a personal computer. In some embodiments, communications interface 570 is an integrated services digital network (ISDN) card or a digital subscriber line (DSL) card or a telephone modem that provides an information communication connection to a corresponding type of telephone line. In some embodiments, a communication interface 570 is a cable modem that converts signals on bus 510 into signals for a communication connection over a coaxial cable or into optical signals for a communication connection over a fiber optic cable. As another example, communications interface 570 may be a local area network (LAN) card to provide a data communication connection to a compatible LAN, such as Ethernet. Wireless links may also be implemented. For wireless links, the communications interface 570 sends and receives electrical, acoustic or electromagnetic signals, including infrared and optical signals, which carry information streams, such as digital data. Such signals are examples of carrier waves In the illustrated embodiment, special purpose hardware, such as an application specific integrated circuit (IC) 520, is coupled to bus 510. The special purpose hardware is configured to perform operations not performed by processor 502 quickly enough for special purposes. Examples of application specific ICs include graphics accelerator cards for generating images for display, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware. Logic encoded in one or more tangible media includes one or both of computer instructions and special purpose hardware.

In the illustrated computer used as a router, the computer system 500 includes switching system 530 as special purpose hardware for switching information for flow over a network. Switching system 530 typically includes multiple communications interfaces, such as communications interface 570, for coupling to multiple other devices. In general, each coupling is with a network link 532 that is connected to another device in or attached to a network, such as local network 580 in the illustrated embodiment, to which a variety of external devices with their own processors are connected. In some embodiments an input interface or an output interface or both are linked to each of one or more external network elements. Although three network links 532a, 532b, 532c are included in network links 532 in the illustrated embodiment, in other embodiments, more or fewer links are connected to switching system 530. Network links 532 typically provides information communication through one or more networks to other devices that use or process the information. For example, network link 532b may provide a connection through local network 580 to a host computer 582 or to equipment 584 operated by an Internet Service Provider (ISP). ISP equipment 584 in turn provides data communication services through the public, world-wide packet-switching communication network of networks now commonly referred to as the Internet 590. A computer called a server 592 connected to the Internet provides a service in response to information received over the Internet. For example, server 592 provides routing information for use with switching system 530.

The switching system 530 includes logic and circuitry configured to perform switching functions associated with passing information among elements of network 580, including passing information received along one network link, e.g. 532a, as output on the same or different network link, e.g., 532c. The switching system 530 switches information traffic arriving on an input interface to an output interface according to pre-determined protocols and conventions that are well known. In some embodiments, switching system 530 includes its own processor and memory to perform some of the switching functions in software. In some embodiments, switching system 530 relies on processor 502, memory 504, ROM 506, storage 508, or some combination, to perform one or more switching functions in software. For example, switching system 530, in cooperation with processor 504 implementing a particular protocol, can determine a destination of a packet of data arriving on input interface on link 532a and send it to the correct destination using output interface on link 532c. The destinations may include host 582, server 592, other terminal devices connected to local network 580 or Internet 590, or other routing and switching devices in local network 580 or Internet 590.

The invention is related to the use of computer system 500 for implementing the techniques described herein. According to one embodiment of the invention, those techniques are performed by computer system 500 in response to processor 502 executing one or more sequences of one or more instructions contained in memory 504. Such instructions, also called software and program code, may be read into memory 504 from another computer-readable medium such as storage device 508. Execution of the sequences of instructions contained in memory 504 causes processor 502 to perform the method steps described herein. In alternative embodiments, hardware, such as application specific integrated circuit 520 and circuits in switching system 530, may be used in place of or in combination with software to implement the invention. Thus, embodiments of the invention are not limited to any specific combination of hardware and software.

The signals transmitted over network link 532 and other networks through communications interfaces such as interface 570, which carry information to and from computer system 500, are example forms of carrier waves. Computer system 500 can send and receive information, including program code, through the networks 580, 590 among others, through network links 532 and communications interfaces such as interface 570. In an example using the Internet 590, a server 592 transmits program code for a particular application, requested by a message sent from computer 500, through Internet 590, ISP equipment 584, local network 580 and network link 532b through communications interface in switching system 530. The received code may be executed by processor 502 or switching system 530 as it is received, or may be stored in storage device 508 or other non-volatile storage for later execution, or both. In this manner, computer system 500 may obtain application program code in the form of a carrier wave.

Various forms of computer readable media may be involved in carrying one or more sequence of instructions or data or both to processor 502 for execution. For example, instructions and data may initially be carried on a magnetic disk of a remote computer such as host 582. The remote computer loads the instructions and data into its dynamic memory and sends the instructions and data over a telephone line using a modem. A modem local to the computer system 500 receives the instructions and data on a telephone line and uses an infra-red transmitter to convert the instructions and data to an infra-red signal, a carrier wave serving as the network link 532b. An infrared detector serving as communications interface in switching system 530 receives the instructions and data carried in the infrared signal and places information representing the instructions and data onto bus 510. Bus 510 carries the information to memory 504 from which processor 502 retrieves and executes the instructions using some of the data sent with the instructions. The instructions and data received in memory 504 may optionally be stored on storage device 508, either before or after execution by the processor 502 or switching system 530.

6.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method comprising:
sending, from a local router over a direct link between the local router and a first neighbor router, an adjacency discovery message that includes a repair address that indicates the local router but that is not advertised as reachable over the direct link;
sending, from the local router to a different second neighbor router, an outbound routing update message that includes reachability data that indicates the repair address is reachable;
forwarding a payload of an inbound tunneled data packet, that is received at the local router and directed to the repair address, based on a destination indicated in the payload;

determining for an interface on the local router a direct address that is unique among routers in a network and a repair address that is unique among interfaces in the network;

receiving an incoming routing update message that includes:
  reachability data that indicates a particular address, which is different from an address of any neighbor of the local router, is reachable through the first neighbor router; and
  repair data that indicates a particular repair address that is a tunnel destination for the particular address when the direct link with the first neighbor router is unavailable; and determining whether the particular repair address is reachable from the local router, wherein if it is determined that the particular repair address is not reachable, then a data packet is encapsulated and directed to the particular address in an outbound tunneled data packet directed to the first neighbor repair address.

2. The method as recited in claim 1, said sending the adjacency discovery message further comprising sending the adjacency discovery message that also includes a direct address that is reachable over the direct link and that uniquely indicates the local router.

3. The method as recited in claim 1, wherein said adjacency discovery message is a HELLO message of an Enhanced Interior Gateway Routing Protocol (EIGRP) and said routing update message is an EIGRP update message.

4. The method as recited in claim 1, further comprising receiving, from the first neighbor router, an inbound adjacency discovery message that is configured not to be forwarded and that includes a first neighbor repair address that indicates the first neighbor router but that is not available on the direct link.

5. The method as recited in claim 4, further comprising:
determining whether the first neighbor router is a feasible successor for a particular destination by determining whether a cost to reach the particular destination from the first neighbor router is not greater than a cost to reach the particular destination from the local router; and
if it is determined that the first neighbor router is a feasible successor for the particular destination, then sending from the local router to the different second neighbor router a different outbound routing update message that is configured to be forwarded and that includes
  reachability data that indicates the particular destination is reachable, and
  repair data that indicates the first neighbor repair address that can be used if communication with the local router is unavailable.

6. The method as recited in claim 4, wherein:
said receiving, from the first neighbor router, an inbound adjacency discovery message further comprises receiving the inbound adjacency discovery message that includes a first neighbor direct address that is available on the direct link and that uniquely indicates the first neighbor; and
the method further comprises sending from the local router to the different second neighbor router the outbound routing update message that is configured to be forwarded and that includes
  the reachability data that indicates the first neighbor direct address is reachable from the local router, and
  repair data that indicates the first neighbor repair address can be used if communication with the local router is unavailable.

7. The method as recited in claim 4, further comprising:
determining whether the first neighbor router is a successor for a particular destination that is not a neighbor of the local router by determining whether a cost to reach the particular destination through a first direct link is not greater than a cost to reach the particular destination from any other link on the local router; and
if it is determined that the first neighbor router is a successor for the particular destination, then sending from the local router to the different second neighbor router a different outbound routing update message that is configured to be forwarded and that includes
  reachability data that indicates the particular destination is reachable, and
  repair data that indicates the first neighbor repair address that can be used if communication with the local router is unavailable.

8. The method as recited in claim 4, further comprising.
receiving, from the different second neighbor router, an incoming routing update message that is configured to be forwarded and that includes
  reachability data that indicates a second particular address is reachable through the second neighbor router, and
  repair data that indicates a particular repair address that can be used to reach the second particular address if communication with the second neighbor router is unavailable; and
determining whether the particular repair address is the same as the first neighbor repair address associated with the first neighbor router; and
if it is determined that the particular repair address is the same as the first neighbor repair address associated with the first neighbor router, then not forwarding the incoming routing update message to any neighbor router of the local router.

9. The method as recited in claim 4, further comprising:
determining whether communication with the first neighbor router over the direct link is unavailable; and
if it is determined that communication with the first neighbor router over the direct link is unavailable, then encapsulating a data packet, that is formerly routed to the first neighbor, in an outbound tunneled data packet that is directed to the first neighbor repair address.

10. The method as recited in claim 9, further comprising:
determining whether a third neighbor router different from the first neighbor router is a feasible successor for a destination of the data packet, that is formerly routed to the first neighbor, by determining whether a cost to reach the destination from the third neighbor router is not greater than a cost to reach the destination from the local router; and
if it is determined that no third neighbor router different from the first neighbor router is a feasible successor, then performing said encapsulating of the data packet in the outbound tunneled data packet.

11. The method as recited in claim 1, further comprising:
determining whether communication with the first neighbor router over the direct link is unavailable; and
if it is determined that communication with the first neighbor router over the direct link is unavailable, then encapsulating a data packet directed to the particular address in an outbound tunneled data packet directed to the particular repair address.

12. A system, comprising:
means for sending, over a direct link between the system and a first neighbor router, an outbound routing protocol adjacency discovery message that includes
a repair address that indicates the system but that is not available on the direct link;
means for sending to a different second neighbor router an outbound routing update message that indicates the repair address is reachable;
means for forwarding a payload of a received inbound tunneled data packet, that is directed to the repair address, based on a destination indicated in the payload; and
means for determining for an interface on a local router a direct address that is unique among routers in a network and a repair address that is unique among interfaces in the network
means for receiving an incoming routing update message that includes:
reachability data that indicates a particular address, which is different from an address of any neighbor of the local router, is reachable through the first neighbor router; and
repair data that indicates a particular repair address that is a tunnel destination for the particular address when the direct link with the first neighbor router is unavailable; and
means for determining whether the particular repair address is reachable from the local router, wherein if it is determined that the particular repair address is not reachable, then a data packet is encapsulated and directed to the particular address in an outbound tunneled data packet directed to the first neighbor repair address.

13. An apparatus comprising:
a first network interface that is configured for communicating a data packet with a packet-switched network;
a second network interface that is configured for communicating a data packet with the packet-switched network; and
logic encoded in one or more non-transitory tangible media for execution and, when executed, operable for:
sending, through the first network interface, an adjacency discovery message that includes
a repair address that indicates the apparatus but that is not advertised as reachable through the first network interface;
sending, through the second network interface, an outbound routing update message that includes reachability data that indicates the repair address is reachable;
forwarding a payload of a received inbound tunneled data packet, that is directed to the repair address, based on a destination indicated in the payload; and
determining for an interface on a local router a direct address that is unique among routers in a network and a repair address that is unique among interfaces in the network;
receiving an incoming routing update message that includes:
reachability data that indicates a particular address, which is different from an address of any neighbor of the local router, is reachable through a first neighbor router; and
repair data that indicates a particular repair address that is a tunnel destination for the particular address when a direct link with the first neighbor router is unavailable; and
determining whether the particular repair address is reachable from the local router, wherein if it is determined that the particular repair address is not reachable, then a data packet is encapsulated and directed to the particular address in an outbound tunneled data packet directed to the first neighbor repair address.

14. The apparatus as recited in claim 13, said sending the adjacency discovery message further comprising sending the adjacency discovery message that also includes a direct address that is reachable over the direct link and that uniquely indicates the local router.

15. The apparatus as recited in claim 13, wherein said adjacency discovery message is a HELLO message of the Enhanced Interior Gateway Routing Protocol (EIGRP) and said routing update message is an EIGRP update message.

16. The apparatus as recited in claim 13, wherein the logic, when executed, is further operable for receiving, through the first network interface, an inbound adjacency discovery message that is configured not to be forwarded and that includes a first neighbor repair address that indicates the first neighbor router but that is not available through the first network interface.

17. The apparatus as recited in claim 16, wherein the logic, when executed, is further operable for:
determining whether the first neighbor router is a feasible successor for a particular destination by determining whether a cost to reach the particular destination from the first neighbor router is not greater than a cost to reach the particular destination from the apparatus; and
if it is determined that the first neighbor router is the feasible successor for the particular destination, then sending through the second network interface a different outbound routing update message that is configured to be forwarded and that includes
reachability data that indicates the particular destination is reachable through the second network interface, and
repair data that indicates the first neighbor repair address that can be used if communication with the second network interface is unavailable.

18. The apparatus as recited in claim 16, wherein:
said receiving, from the first neighbor router, the inbound adjacency discovery message further comprises receiving the inbound adjacency discovery message that includes a first neighbor direct address that is available on the direct link and that uniquely indicates the first neighbor; and
the logic, when executed, is further operable for sending through the second network interface the outbound routing update message that is configured to be forwarded and that includes
reachability data that indicates a second direct address is reachable through the second network interface, and
repair data that indicates the first neighbor repair address can be used if communication with the second network interface is unavailable.

19. The apparatus as recited in claim 16, wherein the logic, when executed, is further operable for:
determining whether the first neighbor router is a successor for a particular destination that is not a neighbor of the apparatus by determining whether a cost to reach the particular destination through the first network interface is not greater than a cost to reach the particular destination from any other network interface on the apparatus; and if it is determined that the first neighbor router is the successor for the particular destination, then sending through the second network interface a different outbound routing update message that is configured to be forwarded and that includes reachability data that indicates the particular destination is reachable through the second network interface, and repair data that indicates the first neighbor repair address that can be used if communication with the second network interface is unavailable.

20. The apparatus as recited in claim 16, wherein the logic, when executed, is further operable for:

receiving, through the second network interface, an incoming routing update message that is configured to be forwarded and that includes reachability data that indicates a second particular address is reachable through the second network interface, and repair data that indicates a particular repair address that can be used to reach the second particular address if communication through the second network interface is unavailable; and determining whether the particular repair address is the same as the first neighbor repair address associated with the first neighbor router; and if it is determined that the particular repair address is the same as the first neighbor repair address associated with the first neighbor router, then not forwarding the incoming routing update message through any network interface of the apparatus.

21. The apparatus as recited in claim 16, wherein the logic, when executed, is further operable for:

determining whether communication through the first network interface is unavailable; and if it is determined that communication through the first network interface is unavailable, then encapsulating a data packet, that is formerly routed through the first network interface, in an outbound tunneled data packet that is directed to the first neighbor repair address.

22. The apparatus as recited in claim 21, wherein the logic, when executed, is further operable for:

determining whether a third neighbor router different from the first neighbor router is a feasible successor for a destination of the data packet, that is formerly routed through the first network interface, by determining whether a cost to reach the destination from the third neighbor router is not greater than a cost to reach the destination from the apparatus; and if it is determined that no third neighbor router different from the first neighbor router is the feasible successor, then performing said encapsulating of the data packet in the outbound tunneled data packet.

23. The apparatus as recited in claim 13, wherein the logic, when executed, is further operable for receiving, through the first network interface, an incoming routing update message that is configured to be forwarded and that includes:

reachability data that indicates a particular address, that is different from an address of any neighbor of the apparatus, is reachable through the first network interface; and repair data that indicates a particular repair address that is a tunnel destination for the particular address when communication through the first network interface is unavailable.

24. The apparatus as recited in claim 23, wherein the logic, when executed, is further operable for:

determining whether communication through the first network interface is unavailable; and if it is determined that communication through the first network interface is unavailable, then encapsulating a data packet directed to the particular address in an outbound tunneled data packet directed to the particular repair address.

25. The apparatus as recited in claim 23, wherein the logic, when executed, is further operable for:

determining whether the particular repair address is reachable from the apparatus; and determining that the particular repair address is not reachable; and encapsulating a data packet directed to the particular address in an outbound tunneled data packet directed to the first neighbor repair address instead of to the particular repair address.

* * * * *